US012012916B2

(12) United States Patent
Katou et al.

(10) Patent No.: US 12,012,916 B2
(45) Date of Patent: Jun. 18, 2024

(54) FUEL INJECTION VALVE

(71) Applicant: DENSO CORPORATION, Kariya (JP)

(72) Inventors: Noritsugu Katou, Kariya (JP); Takanori Kitou, Kariya (JP); Sao Yoshidome, Obu (JP)

(73) Assignee: DENSO CORPORATION, Kariya (JP)

( * ) Notice: Subject to any disclaimer, the term of this patent is extended or adjusted under 35 U.S.C. 154(b) by 377 days.

(21) Appl. No.: 17/554,723

(22) Filed: Dec. 17, 2021

(65) Prior Publication Data

US 2022/0106934 A1 Apr. 7, 2022

Related U.S. Application Data

(63) Continuation of application No. PCT/JP2020/023522, filed on Jun. 16, 2020.

(30) Foreign Application Priority Data

Jun. 20, 2019 (JP) ................................ 2019-114737

(51) Int. Cl.
*F02M 51/06* (2006.01)
*F02M 61/18* (2006.01)

(52) U.S. Cl.
CPC ............ *F02M 51/06* (2013.01); *F02M 61/18* (2013.01)

(58) Field of Classification Search
CPC .... F02M 51/06; F02M 61/18; F02M 61/1813; F02M 61/1833
See application file for complete search history.

(56) References Cited

U.S. PATENT DOCUMENTS

2007/0181094 A1* 8/2007 Katou .................... F02M 67/00 123/298
2009/0050717 A1* 2/2009 Takase ............... F02M 61/1886 239/533.12
2009/0242670 A1 10/2009 Kato
2010/0282872 A1 11/2010 Krause
2016/0319793 A1* 11/2016 Schuele ................. F02M 61/04
2019/0093617 A1 3/2019 Niwa et al.
2019/0277236 A1* 9/2019 Harada .............. F02M 61/1886
2020/0032755 A1* 1/2020 Ishii ................... F02M 63/0071

FOREIGN PATENT DOCUMENTS

JP 2006-207452 8/2006
JP 2012-246897 12/2012
JP 2013068125 A 4/2013
JP 2015-25406 2/2015

* cited by examiner

*Primary Examiner* — John Kwon
*Assistant Examiner* — Johnny H Hoang
(74) *Attorney, Agent, or Firm* — Nixon & Vanderhye P.C.

(57) ABSTRACT

An opening intersection point is between a nozzle hole axis and an inlet opening portion. A normal line of a suction wall surface at the opening intersection point intersects a nozzle hole inner wall or an imaginary inner wall which is an extension of the nozzle hole inner wall. A distance from an outlet opening portion to an inner wall intersection point, which is an intersection point between the normal line and the nozzle hole inner wall or the imaginary inner wall, is LA. An nozzle hole length between the inlet opening portion and the outlet opening portion of the nozzle hole inner wall on a side where the inner wall intersection point is formed is LB. The nozzle hole is provided such that LA/LB>−0.2.

3 Claims, 34 Drawing Sheets

FUEL INJECTION VALVE

CROSS REFERENCE TO RELATED APPLICATION

The present application is a continuation application of International Patent Application No, PCT/JP2020/023522 filed on Jun. 16, 2020, which designated the U.S. and claims the benefit of priority from Japanese Patent Application No. 2019-114737 filed on Jun. 20, 2019. The entire disclosures of all of the above applications are incorporated herein by reference.

TECHNICAL FIELD

The present disclosure relates to a fuel injection valve.

BACKGROUND

A known fuel injection valve configured to inject a high-pressure fuel is required to enhance atomization of fuel and to reduce low penetration of fuel spray.

SUMMARY

According to an aspect of the present disclosure, a fuel injection valve comprises a nozzle, a needle, and a drive unit. The nozzle includes a nozzle cylinder portion that forms a fuel passage therein, a nozzle bottom portion that closes one end of the nozzle cylinder portion, a suction wall surface that is recessed from a surface of the nozzle bottom portion on a side of the nozzle cylinder portion to a side opposite from the nozzle cylinder portion and that forms a suction chamber therein, an annular valve seat that is provided on a periphery of the suction wall surface, and a plurality of nozzle holes that connects the suction wall surface with a surface of the nozzle bottom portion on the side opposite from the nozzle cylinder portion to inject fuel in the fuel passage therethrough. The needle is provided to reciprocate inside the nozzle and configured to close the nozzle holes when the needle comes into contact with the valve seat and open the nozzle hole when the needle separates from the valve seat. The drive unit is configured to move the needle in a valve opening direction and in a valve closing direction.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
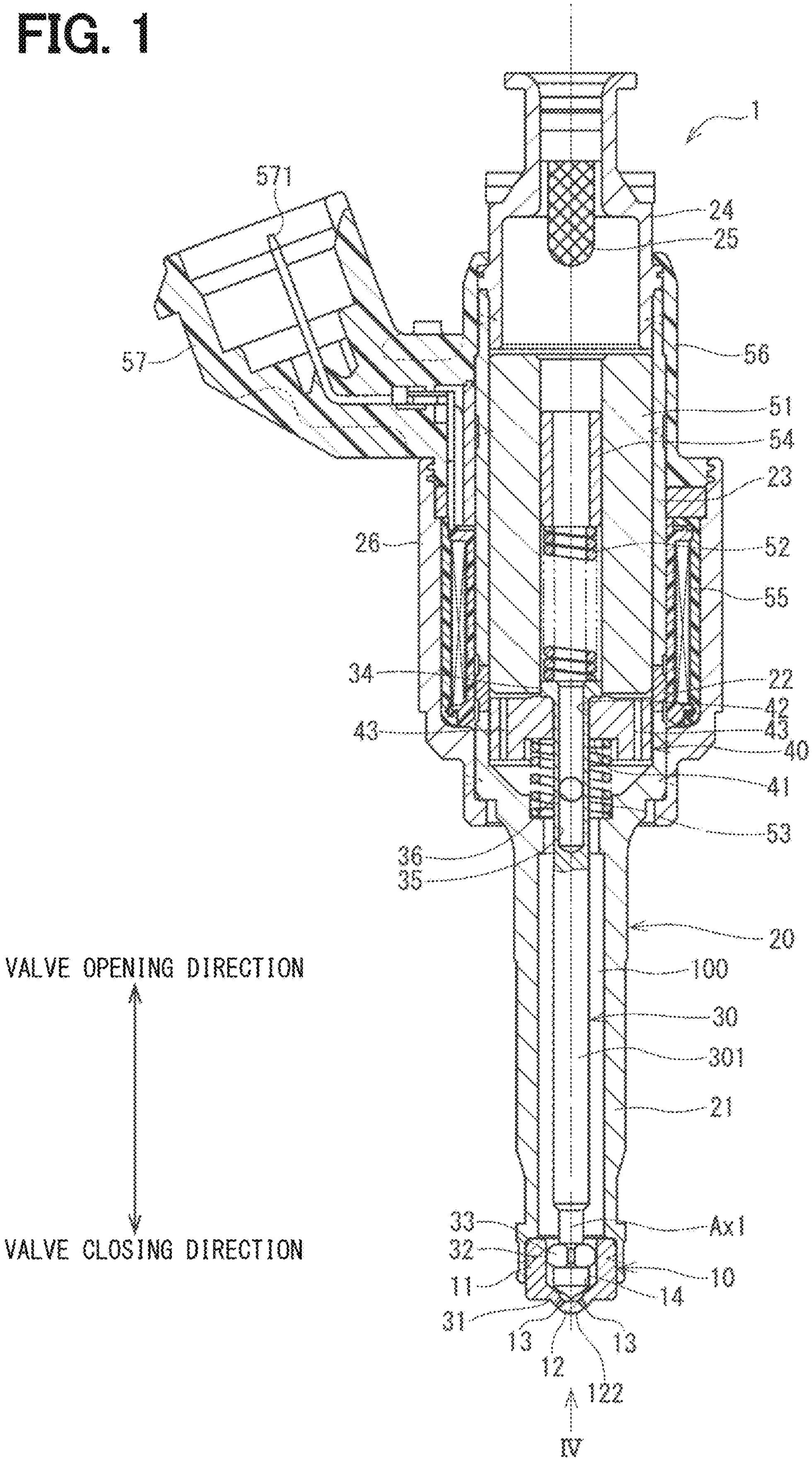
FIG. 1 is a cross-sectional view showing a fuel injection valve according to a first embodiment.

As follows, examples of the present disclosure will be described.

In recent years, in a fuel injection valve capable of injecting a high-pressure fuel, atomization and low penetration of fuel spray are required.

According to an example of the present disclosure, a fuel injection valve is configured to regulate the flow of a fuel between a valve seat and a needle and to cause the fuel to collide with an inner wall of a nozzle hole to form a liquid film, and therefore, fuel spray is atomized and penetration is reduced.

However, in the fuel injection valve of this example, as a pressure of the fuel in the fuel injection valve increases, a pressure loss between the valve seat and the needle may increase. If the pressure loss is large, high-pressure energy cannot be effectively utilized, and the fuel spray may not be sufficiently atomized.

A fuel injection valve according to an example of the present disclosure comprises a nozzle, a needle, and a drive unit. The nozzle includes a nozzle cylinder portion that forms a fuel passage therein, a nozzle bottom portion that closes one end of the nozzle cylinder portion, a suction wall surface that is recessed from a surface of the nozzle bottom portion on a side of the nozzle cylinder portion to a side opposite from the nozzle cylinder portion and that forms a suction chamber therein, an annular valve seat that is provided on a periphery of the suction wall surface, and a plurality of nozzle holes that connects the suction wall surface with a surface of the nozzle bottom portion on the side opposite from the nozzle cylinder portion to inject fuel in the fuel passage therethrough.

The needle is provided to reciprocate inside the nozzle and configured to close the nozzle holes when the needle comes into contact with the valve seat and open the nozzle hole when the needle separates from the valve seat. The drive unit is configured to move the needle in a valve opening direction and in a valve closing direction.

A minimum value of a flow channel area between the valve seat and the needle in a case where the needle is most separated from the valve seat is a seat throttle area As, a minimum value of a flow channel area of the nozzle hole being a nozzle hole throttle area Ah, and $As>Ah$ being satisfied. A nozzle hole of the nozzle holes includes an inlet opening portion provided on the suction wall surface, an outlet opening portion provided on the surface of the nozzle bottom portion on the side opposite from the nozzle cylinder portion, and a nozzle hole inner wall connecting the inlet opening portion with the outlet opening portion.

At least one of the nozzle holes is a tapered nozzle hole formed in a tapered shape such that the nozzle hole inner wall is to be distant from a nozzle hole axis, which is an axis of the nozzle hole, toward the outlet opening portion from the inlet opening portion. At least one of the tapered nozzle holes is provided such that a normal line of the suction wall surface at an opening intersection point, which is an intersection point between the nozzle hole axis and the inlet opening portion, intersects the nozzle hole inner wall or an imaginary inner wall, the imaginary inner wall extending the nozzle hole inner wall to the side opposite from the nozzle cylinder portion.

In the present disclosure, since $As>Ah$, the fuel is not throttled between the valve seat and the needle, and flows into the suction chamber in a state where the pressure loss is small. Therefore, the fuel flowing into the suction chamber flows along the normal line of the suction wall surface at the opening intersection point which is the intersection point between the nozzle hole axis and the inlet opening portion, and collides with the nozzle hole inner wall. When a high-pressure fuel collides with the nozzle hole inner wall, a liquid film is effectively formed in the nozzle hole. Therefore, it is possible to utilize the pressure energy of the fuel to effectively atomize the fuel spray injected from a nozzle hole.

In a cross section along an imaginary plane including the nozzle hole axis, a distance from the outlet opening portion to an inner wall intersection point, which is an intersection point between the normal line and the nozzle hole inner wall or the imaginary inner wall, is LA, a nozzle hole length, which is a length between the inlet opening portion and the outlet opening portion of the nozzle hole inner wall on a side where the inner wall intersection point is formed, is LB, and the tapered nozzle hole is provided such that $LA/LB > -0.2$ is satisfied. Therefore, the high-pressure fuel can be effectively collided with the nozzle hole inner wall, and the liquid film can be effectively formed in the nozzle hole. Therefore, the fuel spray injected from the nozzle hole can be atomized more effectively.

A plurality of embodiments of a fuel injection valve will be described below with reference to the drawings. The same reference numerals are given to corresponding components in the plurality of embodiments, and description is be omitted. In the plurality of embodiments, substantially the substantially same component produces the same or similar effect.

First Embodiment

A fuel injection valve according to a first embodiment is shown in FIG. 1. A fuel injection valve 1 is applied to, for example, a gasoline engine (hereinafter, simply referred to as "engine") 80 as an internal combustion engine, and injects gasoline as a fuel to supply into the engine 80 (see FIG. 2).

Figure 2:
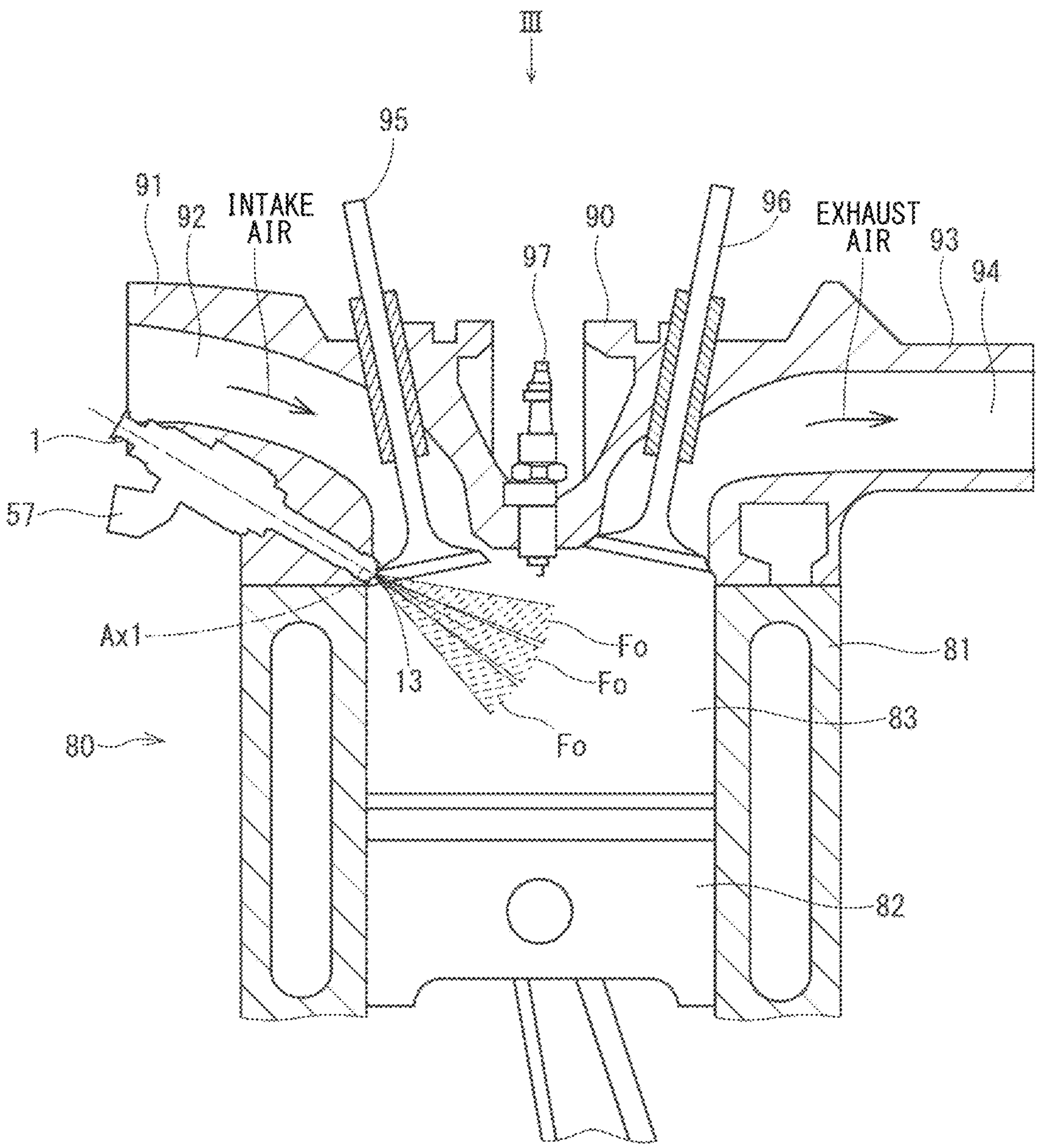
FIG. 2 is a view showing a state in which the fuel injection valve according to the first embodiment is applied to an internal combustion engine.

As shown in FIG. 2, the engine 80 includes a cylindrical cylinder block 81, a piston 82, a cylinder head 90, an intake valve 95, an exhaust valve 96, and the like. The piston 82 is provided so as to be reciprocating inside the cylinder block 81. The cylinder head 90 is provided so as to close an opening end of the cylinder block 81. A combustion chamber 83 is provided between an inner wall of the cylinder block 81, a wall surface of the cylinder head 90, and the piston 82. A volume of the combustion chamber 83 increases or decreases as the piston 82 reciprocates.

The cylinder head 90 includes an intake manifold 91 and an exhaust manifold 93. An intake passage 92 is provided in the intake manifold 91. One end of the intake passage 92 is open to an atmosphere, and the other end is connected to the combustion chamber 83. The intake passage 92 guides air sucked from the atmosphere (hereinafter, referred to as "intake air") to the combustion chamber 83.

An exhaust passage 94 is provided in the exhaust manifold 93. One end of the exhaust passage 94 is connected to the combustion chamber 83, and the other end is open to the atmosphere. The exhaust passage 94 guides air containing combustion gas generated in the combustion chamber 83 (hereinafter, referred to as "exhaust air") to the atmosphere.

The intake valve 95 is provided on the cylinder head 90 such that the intake valve 95 is capable of reciprocating by rotation of a cam of a driven shaft that rotates in conjunction with a drive shaft (not shown). The intake valve 95 can be opened and closed between the combustion chamber 83 and the intake passage 92 by reciprocating. The exhaust valve 96 is provided on the cylinder head 90 such that the exhaust valve 96 is capable of reciprocating by rotation of the cam. The exhaust valve 96 can be opened and closed between the combustion chamber 83 and the exhaust passage 94 by reciprocating.

In the present embodiment, the fuel injection valve 1 is mounted on a side of the cylinder block 81 of the intake passage 92 of the intake manifold 91. The fuel injection valve 1 is provided such that a center line is inclined or has a twisting relationship with respect to a center line of the combustion chamber 83. The center line of the combustion chamber 83 is an axis of the combustion chamber 83 and coincides with an axis of the cylinder block 81. In the present embodiment, the fuel injection valve 1 is provided on a side of the combustion chamber 83. That is, the fuel injection valve 1 is mounted on a side of the engine 80 and is used.

An ignition plug 97 as an ignition device is provided between the intake valve 95 and the exhaust valve 96 of the cylinder head 90, that is, at a position corresponding to a center of the combustion chamber 83. The ignition plug 97 is provided at a position where the fuel injected from the fuel injection valve 1 does not directly adhere, and at a position where an air-fuel mixture (combustible air) in which the fuel and the intake air are mixed can be ignited. As described above, the engine 80 is a direct injection type gasoline engine.

The fuel injection valve 1 is provided such that multiple nozzle holes 13 are exposed on a portion on an outer side in a radial direction of the combustion chamber 83, The fuel injection valve 1 is supplied with a fuel pressurized to a fuel injection pressure by a fuel pump (not shown). Conical fuel spray Fo is injected into the combustion chamber 83 from the multiple nozzle holes 13 of the fuel injection valve 1.

Figure 3:
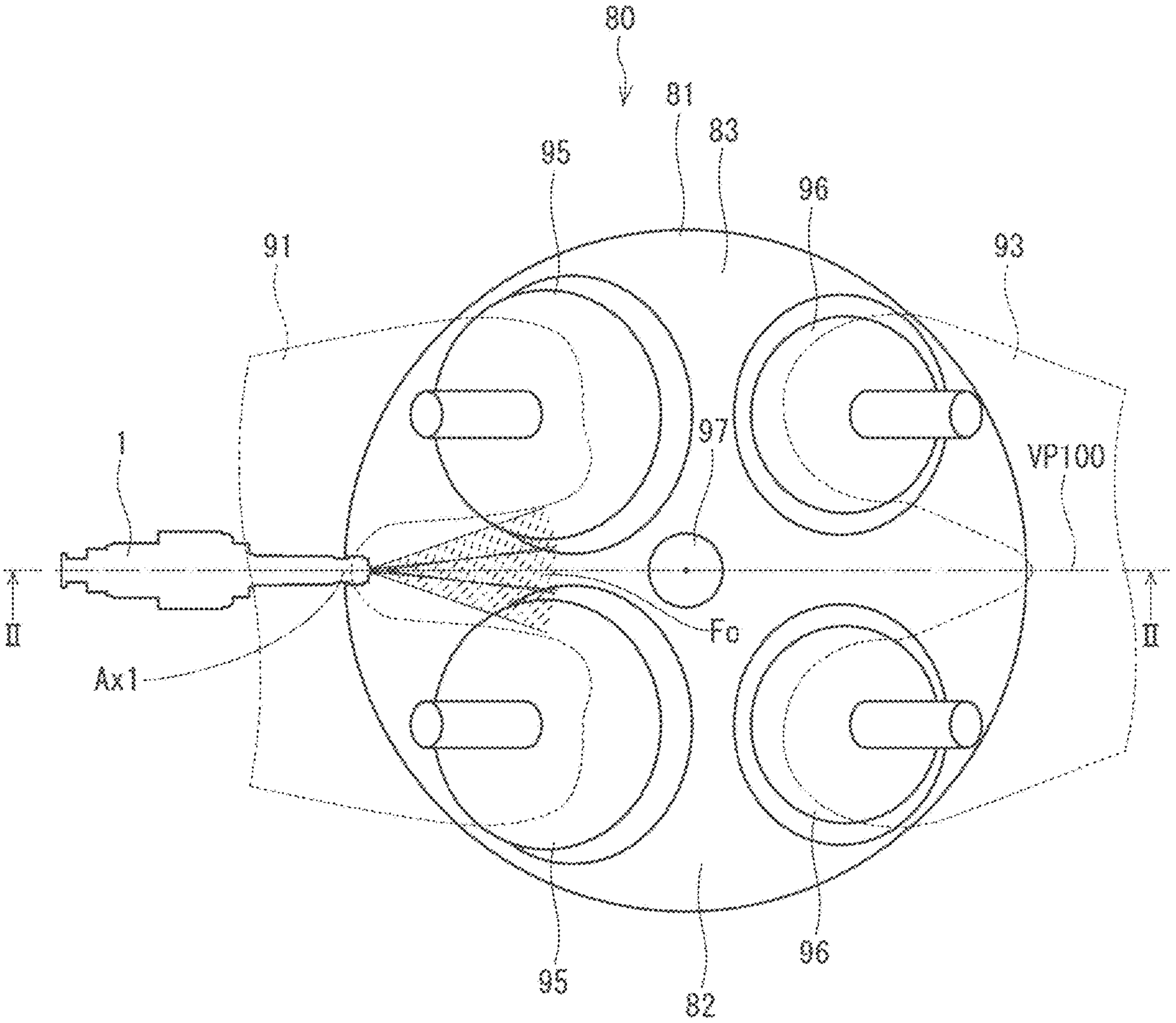
FIG. 3 is a view of FIG. 2 from a direction of an arrow III.

As shown in FIG. 3, in the present embodiment, two intake valves 95 and two exhaust valves 96 are provided in the engine 80, The two intake valves 95 are provided at two branched end portions of the intake manifold 91 on the side of the cylinder block 81, respectively. The two exhaust valves 96 are provided at two branched end portions of the exhaust manifold 93 on the side of the cylinder block 81, respectively. The fuel injection valve 1 is provided on the intake manifold 91 such that a center line is along an imaginary plane VP100 that includes the axis of the cylinder block 81 and passes between the two intake valves 95 and between the two exhaust valves 96.

Next, a basic configuration of the fuel injection valve 1 is described with reference to FIG. 1. The fuel injection valve 1 includes a nozzle 10, a housing 20, a needle 30, a movable core 40, a fixed core 51, a spring 52 as a valve seat side urging member, a spring 53 as a fixed core side urging member, a coil 55 as a drive unit, and the like.

Figure 4:
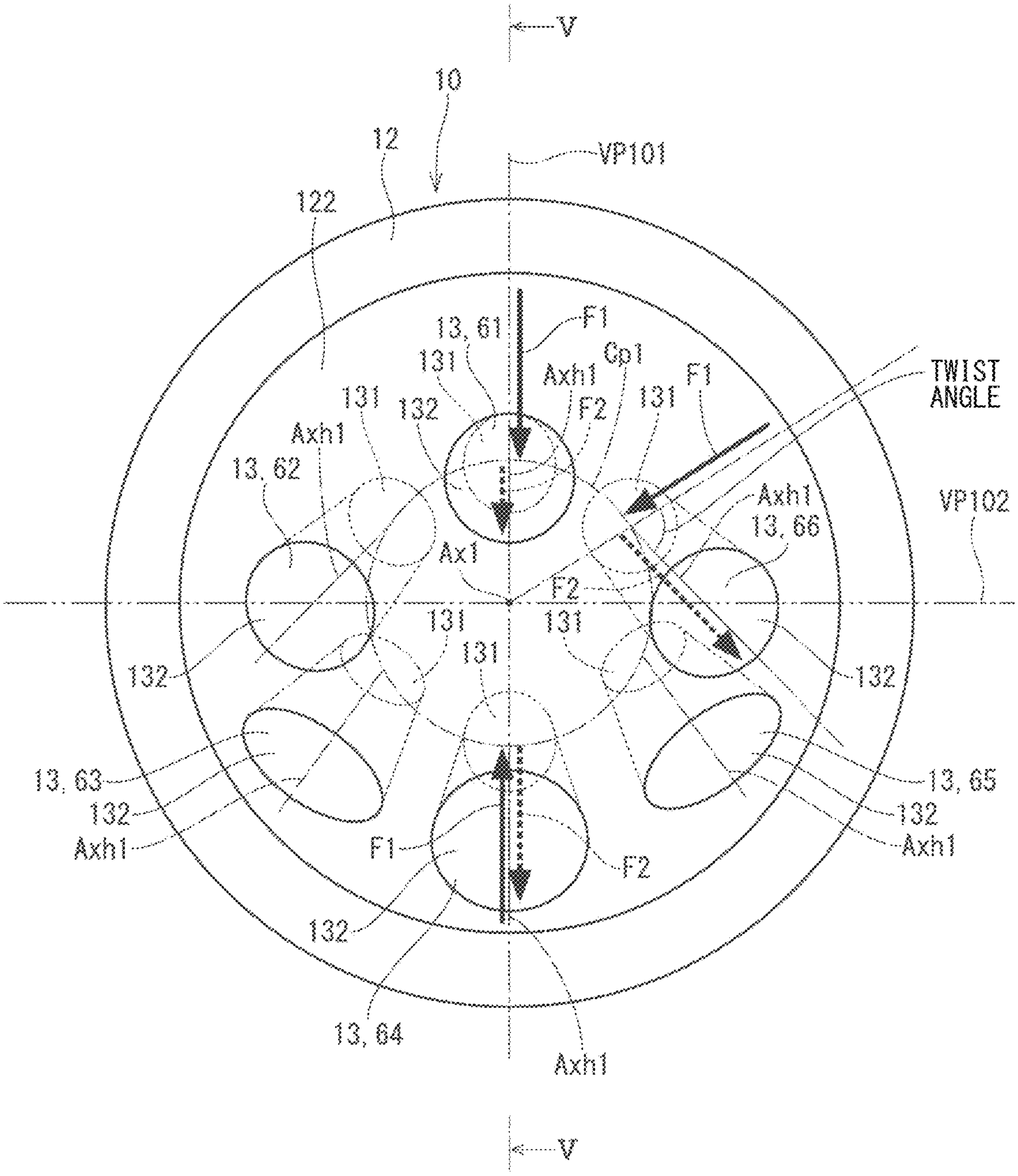
FIG. 4 is a view of FIG. 1 from a direction of an arrow IV.
Figure 5:
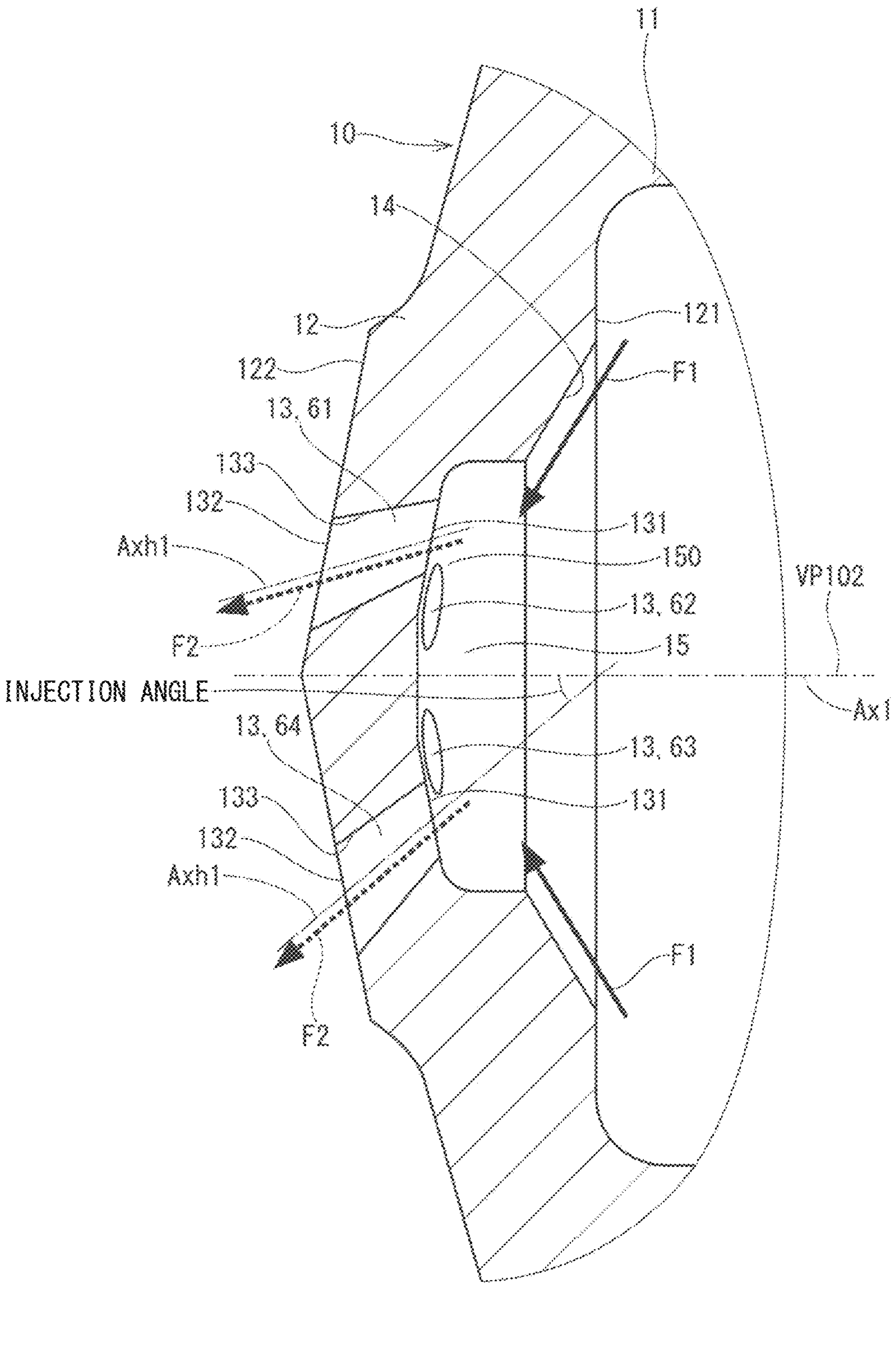
FIG. 5 is a cross-sectional view taken along a line V-V of FIG. 4.

The nozzle 10 is made of a metal such as martensitic stainless steel. The nozzle 10 is hardened so as to have a predetermined hardness. As shown in FIGS. 1, 4 and 5, the nozzle 10 includes a nozzle cylinder portion 11, a nozzle bottom portion 12, a nozzle hole 13, a valve seat 14, and the like.

The nozzle cylinder portion 11 is provided in a substantially cylindrical shape. The nozzle bottom portion 12 closes one end of the nozzle cylinder portion 11. The nozzle hole 13 is provided so as to connect a surface of the nozzle bottom portion 12 on a side of the nozzle cylinder portion 11, that is, an inner wall, and a surface 122 on a side opposite from the nozzle cylinder portion 11 (see FIG. 5). Multiple nozzle holes 13 are provided in the nozzle bottom portion 12. In the present embodiment, six nozzle holes 13 are provided (see FIG. 4). The valve seat 14 is provided in an annular shape on a periphery of the nozzle hole 13 on a surface of the nozzle bottom portion 12 on the side of the nozzle cylinder portion 11. The nozzle hole 13 will be described in detail later.

The housing 20 includes a first cylinder member 21, a second cylinder member 22, a third cylinder member 23, an inlet portion 24, and the like.

The first cylinder member 21, the second cylinder member 22, and the third cylinder member 23 are all provided in a substantially cylindrical shape. The first cylinder member 21, the second cylinder member 22, and the third cylinder member 23 are disposed so as to be coaxial in an order of the first cylinder member 21, the second cylinder member 22, and the third cylinder member 23, and are connected to each other.

The first cylinder member 21 and the third cylinder member 23 are made of a magnetic material such as ferritic stainless steel and are subjected to a magnetic stabilization treatment. The second cylinder member 22 is made of a non-magnetic material such as austenitic stainless steel. The second cylinder member 22 functions as a magnetic throttle portion.

The first cylinder member 21 is provided such that an inner wall at an end portion on a side opposite from the second cylinder member 22 fits into an outer wall of the nozzle cylinder portion 11 of the nozzle 10. The inlet portion 24 is provided in a tubular shape by, for example, a magnetic material such as ferritic stainless steel. The inlet portion 24 is provided such that one end thereof is connected to an end portion of the third cylinder member 23 on a side opposite from the second cylinder member 22.

A fuel passage 100 is provided inside the housing 20. The fuel passage 100 is connected to the nozzle hole 13. That is, the nozzle cylinder portion 11 of the nozzle 10 forms the fuel passage 100 therein. A pipe (not shown) is connected to the inlet portion 24 on a side opposite from the third cylinder member 23. Accordingly, a fuel from a fuel supply source (fuel pump) flows into the fuel passage 100 through the pipe. The fuel passage 100 guides the fuel to the nozzle hole 13.

A filter 25 is provided inside the inlet portion 24. The filter 25 collects foreign matters in the fuel flowing into the fuel passage 100.

The needle 30 is provided in a rod shape by, for example, a metal such as martensitic stainless steel. The needle 30 is hardened so as to have a predetermined hardness.

The needle 30 is housed in the housing 20 so as to be able to reciprocate in the fuel passage 100 in an axial direction of the housing 20, The needle 30 includes a needle body 301, a seat portion 31, a large diameter portion 32, a flange portion 34, and the like.

The needle body 301 is provided in a rod shape. The seat portion 31 is provided at an end portion of the needle body 301 on a side of the nozzle 10 and can come into contact with the valve seat 14.

The large diameter portion 32 is provided in a vicinity of the seat portion 31 at an end portion of the needle body 301 on a side of the valve seat 14. An outer diameter of the large diameter portion 32 is set to be larger than an outer diameter of the end portion of the needle body 301 on the side of the valve seat 14. The large diameter portion 32 is provided such that an outer wall thereof slides on an inner wall of the nozzle cylinder portion 11 of the nozzle 10. Accordingly, the needle 30 is guided to reciprocate in an axial direction of the end portion on the side of the valve seat 14. The large diameter portion 32 is formed with notch portions 33 such that multiple portions in a circumferential direction of the outer wall are notched. Accordingly, the fuel can flow between the notch portions 33 and the inner wall of the nozzle cylinder portion 11.

The flange portion 34 is provided in a substantially cylindrical shape so as to extend to the outer side in the radial direction from the end portion of the needle body 301 on a side opposite from the seat portion 31.

The needle body 301 has an axial hole portion 35 and a radial hole portion 36. The axial hole portion 35 is provided so as to extend in the axial direction from an end surface of the needle body 301 on a side opposite from the seat portion 31. The radial hole portion 36 is provided so as to extend in the radial direction of the needle body 301 to connect the axial hole portion 35 and the outer wall of the needle body 301. Accordingly, the fuel on a side opposite from the nozzle 10 with respect to the needle 30 can flow between the outer wall of the needle body 301 and an inner wall of the first cylinder member 21 through the axial hole portion 35 and the radial hole portion 36.

The needle 30 opens and closes the nozzle hole 13 when the seat portion 31 is separated from (lifted from) the valve seat 14 or is in contact with (seated on) the valve seat 14. Hereinafter, a direction in which the needle 30 is separated from the valve seat 14 is referred to as a valve opening direction, and a direction in which the needle 30 comes into contact with the valve seat 14 is referred to as a valve closing direction.

The movable core 40 is provided in a tubular shape by, for example, a magnetic material such as ferritic stainless steel. The movable core 40 is subjected to a magnetic stabilization treatment. The movable core 40 is provided inside the first cylinder member 21 and the second cylinder member 22 of the housing 20.

The movable core 40 is provided in a substantially columnar shape. The movable core 40 has a recess portion 41, a shaft hole 42, and a through hole 43.

The recess portion 41 is provided so as to be recessed from a center of an end surface of the movable core 40 on a side of the nozzle 10 to a side opposite from the nozzle 10. The shaft hole 42 is provided so as to connect an end surface of the movable core 40 on a side opposite from the nozzle 10 and a bottom surface of the recess portion 41 so as to pass through an axis of the movable core 40. The through hole 43 is provided so as to connect the end surface of the movable core 40 on the side of the nozzle 10 and the end surface of the movable core 40 on the side opposite from the nozzle 10. Multiple through holes 43 are provided at equal intervals in the circumferential direction of the movable core 40 on an outer side in the radial direction of the recess portion 41.

The movable core 40 is provided inside the housing 20 in a state where the needle body 301 is inserted through the shaft hole 42. That is, the movable core 40 is provided on an outer side in the radial direction of the needle body 301. The movable core 40 can move relative to the needle body 301 in the axial direction. The inner wall forming the shaft hole 42 of the movable core 40 is slidable with the outer wall of the needle body 301.

In the movable core 40, a portion on a periphery of the shaft hole 42 of the end surface on the side opposite from the nozzle 10 can be in contact with an end surface of the flange portion 34 on the side of the nozzle 10, or can be separated from the end surface of the flange portion 34 on the side of the nozzle 10.

The fixed core 51 is provided in a substantially cylindrical shape by a magnetic material such as ferritic stainless steel. The fixed core 51 is subjected to a magnetic stabilization treatment. The fixed core 51 is provided on a side of the movable core 40 opposite from the nozzle 10. The fixed core 51 is provided inside the housing 20 such that an outer wall thereof is connected to inner walls of the second cylinder member 22 and the third cylinder member 23. An end surface of the fixed core 51 on the side of the nozzle 10 can come into contact with the end surface of the movable core 40 on the side of the fixed core 51.

A cylindrical adjusting pipe 54 is press-fitted inside the fixed core 51, The spring 52 is, for example, a coil spring, and is provided between the adjusting pipe 54 inside the fixed core 51 and the needle 30, One end of the spring 52 is in contact with the adjusting pipe 54, The other end of the spring 52 is in contact with the end surfaces of the needle body 301 and the flange portion 34 on the side opposite from the nozzle 10. The spring 52 can urge the movable core 40 and the needle 30 toward the side of the nozzle 10, that is, in the valve closing direction. An urging force of the spring 52 is adjusted by a position of the adjusting pipe 54 with respect to the fixed core 51.

The coil 55 is provided in a substantially cylindrical shape, and is provided so as to surround an outer side of the housing 20, particularly, the second cylinder member 22 and the third cylinder member 23 in the radial direction. A tubular holder 26 is provided on an outer side of the coil 55 in the radial direction so as to cover the coil 55. The holder 26 is made of a magnetic material such as ferritic stainless steel. In the holder 26, an inner wall of one end thereof is connected to an outer wall of the first cylinder member 21, and an inner wall of the other end thereof is magnetically connected to an outer wall of the third cylinder member 23.

The coil 55 generates a magnetic force when an electric power is supplied (energized). When a magnetic force is generated in the coil 55, a magnetic circuit is formed in the movable core 40, the first cylinder member 21, the holder 26, the third cylinder member 23, and the fixed core 51, avoiding the second cylinder member 22 as the magnetic throttle portion. Accordingly, a magnetic attraction force is generated between the fixed core 51 and the movable core 40, and the movable core 40 and the needle 30 are attracted to the fixed core 51. Accordingly, the needle 30 moves in the valve opening direction, the seat portion 31 is separated from the valve seat 14, and the valve is opened. As a result, the nozzle hole 13 is opened, and the fuel is injected from the nozzle hole 13. Therefore, when the coil 55 is energized, the movable core 40 can be attracted to the fixed core 51 and the needle 30 can be moved to the side opposite from the valve seat 14, that is, in the valve opening direction.

When the movable core 40 is attracted to the fixed core 51 (in the valve opening direction) by the magnetic attraction force, the flange portion 34 of the needle 30 moves inside the fixed core 51 in the axial direction. At this time, an outer wall of the flange portion 34 and an inner wall of the fixed core 51 slide. Therefore, reciprocation of the needle 30 in the axial direction of an end portion on a side of the flange portion 34 is guided by the fixed core 51.

When the movable core 40 is attracted to the fixed core 51 (in the valve opening direction) by the magnetic attraction force, an end surface on the side of the fixed core 51 collides with the end surface of the fixed core 51 on the side of the movable core 40. Accordingly, the movable core 40 is restricted from moving in the valve opening direction.

When the energization of the coil 55 is stopped in a state where the movable core 40 is attracted to the fixed core 51, the needle 30 and the movable core 40 are urged to the valve seat 14 by the urging force of the spring 52. Accordingly, the needle 30 moves in the valve closing direction, the seat portion 31 comes into contact with the valve seat 14, and the valve is closed. As a result, the nozzle hole 13 is closed.

The spring 53 is, for example, a coil spring, and is provided in a state where one end thereof is in contact with the bottom surface of the recess portion 41 of the movable core 40 and the other end thereof is in contact with a stepped surface of the inner wall of the first cylinder member 21 of the housing 20. The spring 53 can urge the movable core 40 toward the fixed core 51, that is, in the valve opening direction. An urging force of the spring 53 is smaller than the urging force of the spring 52. Therefore, when the coil 55 is not energized, the seat portion 31 of the needle 30 is pressed against the valve seat 14 by the spring 52, and the movable core 40 is pressed against the flange portion 34 by the spring 53.

As shown in FIG. 1, the outer side of the third cylinder member 23 in the radial direction is molded by a mold portion 56 made of resin. A connector portion 57 is provided so as to project outward in the radial direction from the mold portion 56. A terminal 571 for supplying electric power to the coil 55 is insert-molded in the connector portion 57.

The fuel flowing in from the inlet portion 24 flows through the filter 25, inside the fixed core 51 and the adjusting pipe 54, through the axial hole portion 35, through the radial hole portion 36, between the needle 30 and the inner wall of the housing 20, and between the needle 30 and the inner wall of the nozzle cylinder portion 11, that is, through the fuel passage 100, and is guided to the nozzle hole 13. When the fuel injection valve 1 is operated, peripheries of the movable core 40 and the needle 30 are filled with the fuel. When the fuel injection valve 1 is operated, the fuel flows through the through hole 43 of the movable core 40, the axial hole portion 35 of the needle 30, and the radial hole portion 36. Therefore, the movable core 40 and the needle 30 can smoothly reciprocate in the axial direction inside the housing 20.

A pressure of the fuel in the fuel passage 100 assumed when the fuel injection valve 1 of the present embodiment is used is, for example, 1 MPa or more. The present embodiment is more advantageous as the pressure of the fuel in the fuel passage 100 becomes as high as 30 MPa or 100 MPa.

In the present embodiment, when the needle 30 is most separated from the valve seat 14, a minimum value of a flow channel area between the valve seat 14 and the needle 30 is set as a seat throttle area As, a minimum value of a flow channel area of the nozzle hole 13 is set as a nozzle hole throttle area Ah, and As >Ah. The seat throttle area As corresponds to a minimum value of an area of an annular flow channel provided between the valve seat 14 and the seat portion 31 when the seat portion 31 of the needle 30 is most separated from the valve seat 14, that is, the end surface of the movable core 40 on the side of the fixed core 51 is in contact with the fixed core 51 and the flange portion 34. The nozzle hole throttle area Ah corresponds to a minimum value of a total area of flow channels of all the six nozzle holes 13. That is, the nozzle hole throttle area Ah is a total area of minimum values of flow channel areas perpendicular to a nozzle hole axis Axh1 of each nozzle hole 13.

In the present embodiment, Ah/As<0.18. Therefore, a pressure loss due to a throttle of the seat portion 31 of the needle 30 can be reduced as much as possible, and large pressure energy can be introduced into a suction chamber 15.

Next, the nozzle hole 13 of the present embodiment will be described in detail. In FIG. 5, the needle 30 is not shown.

As shown in FIG. 5, the nozzle 10 includes a suction wall surface 150, inlet opening portions 131, outlet opening portions 132, nozzle hole inner walls 133, the nozzle holes 13, and the valve seat 14.

The suction wall surface 150 is recessed from a center of a surface 121 of the nozzle bottom portion 12 on the side of the nozzle cylinder portion 11 to the side opposite from the nozzle cylinder portion 11, and forms the suction chamber 15 therein. The suction chamber 15 is provided between the suction wall surface 150 and the seat portion 31 of the needle 30.

The valve seat 14 is provided in an annular shape on a periphery of the suction wall surface 150 of the surface 121.

The valve seat 14 is provided in a tapered shape so as to approach an axis Ax1 of the nozzle cylinder portion 11 from the nozzle cylinder portion 11 toward the suction wall surface 150.

The nozzle hole 13 connects the suction wall surface 150 and the surface 122 of the nozzle bottom portion 12 on the side opposite from the nozzle cylinder portion 11 to inject the fuel in the fuel passage 100. The suction wall surface 150 is provided in a curved surface shape.

As shown in FIG. 5, the nozzle hole 13 has the inlet opening portion 131 provided on the suction wall surface 150, which is a surface of the nozzle bottom portion 12 on the side of the nozzle cylinder portion 11, the outlet opening portion 132 provided on the surface 122 of the nozzle bottom portion 12 on the side opposite from the nozzle cylinder portion 11, and the nozzle hole inner wall 133 that connects the inlet opening portion 131 and the outlet opening portion 132.

The inlet opening portion 131 means a closed region as an imaginary plane formed along the suction wall surface 150 by opening a hole (the nozzle hole 13) in the nozzle bottom portion 12, and an area of the region is set as an area of the inlet opening portion 131. The outlet opening portion 132 means a closed region as an imaginary plane formed along the surface 122 of the nozzle bottom portion 12 on the side opposite from the nozzle cylinder portion 11 by opening a hole (the nozzle hole 13) in the nozzle bottom portion 12, and an area of the region is set as an area of the outlet opening portion 132. In each of the six nozzle holes 13, the area of the outlet opening portion 132 is larger than the area of the inlet opening portion 131.

In the present embodiment, the six nozzle holes 13 are provided in a tapered shape such that the nozzle hole inner wall 133 is distant from the nozzle hole axis Axh1, which is an axis of the nozzle hole 13, as the nozzle hole inner wall 133 goes from the inlet opening portion 131 to the outlet opening portion 132. The six nozzle holes 13 correspond to "tapered nozzle holes".

As shown in FIG. 4, in the present embodiment, six inlet opening portions 131 of the nozzle holes 13 are provided so as to be disposed in the circumferential direction of the nozzle bottom portion 12, For illustration, each of the six nozzle holes 13 is referred to as nozzle holes 61, 62, 63, 64, 65, and 66. In the present embodiment, centers of the inlet opening portions 131 of the nozzle holes 61, 62, 63, 64, 65, and 66 are disposed at equal intervals on a pitch circle Cp1 centered on the axis Ax1.

The nozzle holes 61 and 64 are provided on an imaginary plane VP101 including the axis Ax1 of the nozzle cylinder portion 11 such that the axis Ax1 of the nozzle cylinder portion 11 is located between the nozzle holes 61 and 64. That is, the imaginary plane VP101 passes through the nozzle holes 61 and 64. The nozzle holes 61 and 64 are provided such that the nozzle hole axes Axh1 are included in the imaginary plane VP101, For the nozzle holes 61 and 64, the nozzle hole axis Axh1 intersects the axis Ax1 of the nozzle cylinder portion 11, and the nozzle hole axis Axh1 is not in a twisted relationship with respect to the axis Ax1 (see FIG. 4).

The inlet opening portions 131 of the nozzle holes 62 and 66 are provided on a side of the nozzle hole 61 with respect to an imaginary plane VP102 including the axis Ax1 of the nozzle cylinder portion 11 and perpendicular to the imaginary plane VP101. The inlet opening portions 131 of the nozzle holes 63 and 65 are provided on a side of the nozzle hole 64 with respect to the imaginary plane VP102. For the nozzle holes 62, 63, 65, and 66, the nozzle hole axis Axh1 does not intersect the axis Ax1 of the nozzle cylinder portion 11, and the nozzle hole axis Axh1 is in a twisted relationship with respect to the axis Ax1 (see FIG. 4).

Figure 6:
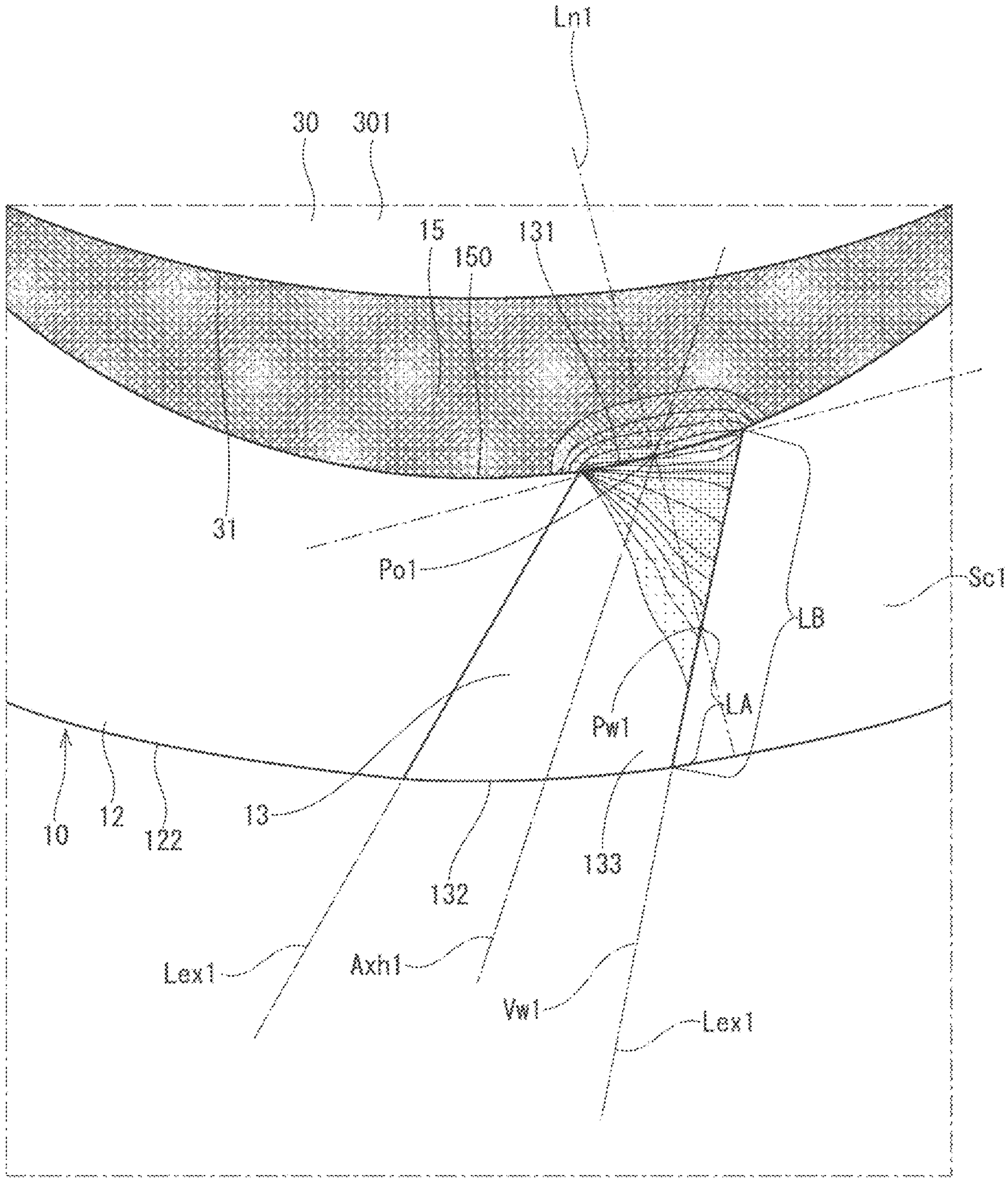
FIG. 6 is a cross-sectional view showing a nozzle hole of the fuel injection valve according to the first embodiment and a vicinity thereof.

As shown in FIG. 6, the nozzle hole 13 is provided such that a normal line Ln1 of the suction wall surface 150 at an opening intersection point Pot, which is an intersection point between the nozzle hole axis Axh1 and the inlet opening portion 131, intersects the nozzle hole inner wall 133 or an imaginary inner wall VW1 extending the nozzle hole inner wall 133 to the side opposite from the nozzle cylinder portion 11. That is, in a cross section including the normal line Ln1 and the nozzle hole axis Axh1, the nozzle hole 13 is provided such that the normal line Ln1 of the suction wall surface 150 at the intersection point between the nozzle hole axis Axh1 and the inlet opening portion 131 intersects the nozzle hole inner wall 133 or an extension line Lexi of the nozzle hole inner wall 133. FIG. 6 shows that the nozzle hole 13 is provided such that the normal line Ln1 intersects the nozzle hole inner wall 133.

As shown in FIG. 6, in a cross section along an imaginary plane Sc1 including the nozzle hole axis Axh1, when a distance from the outlet opening portion 132 to an inner wall intersection point Pw1, which is an intersection point between the normal line Ln1 and the nozzle hole inner wall 133 or the imaginary inner wall VW1, is set as LA, and a nozzle hole length, which is a length between the inlet opening portion 131 and the outlet opening portion 132 of the nozzle hole inner wall 133 on a side where the innerwall intersection point Pw1 is formed, is set as LB, the nozzle hole 13 is provided such that $LA/LB > -0.2$. More specifically, the nozzle hole 13 is provided such that $1 > LA/LB > -0.2$.

When the normal line Ln1 intersects the nozzle hole inner wall 133 (see FIG. 6), LA takes a positive value. Therefore, LA/LB is a positive value. On the other hand, when the normal line Ln1 intersects the imaginary inner wall VW1, LA takes a negative value, Therefore, LA/LB is a negative value.

In the present embodiment, the normal line Ln1 intersects the nozzle hole inner wall 133 on a side of the axis Ax1 of the nozzle cylinder portion 11 of the two nozzle hole inner walls 133 shown in the cross section along the imaginary plane Sc1.

A direction of the normal line Ln1 is determined by a shape of the suction wall surface 150 on which the inlet opening portion 131 is provided.

As shown in FIGS. 4 and 5, when the valve is opened, the fuel flows toward an inner side in the radial direction of the nozzle bottom portion 12 along the valve seat 14 (see arrows F1 in FIGS. 4 and 5). The fuel in the suction chamber 15 flows to an outside of the nozzle 10 along the nozzle hole axis Axh1 of the nozzle hole 13 (see arrows F2 in FIGS. 4 and 5). As shown in FIG. 4, for example, in the nozzle hole 66 in which the nozzle hole axis Axh1 has a twisted relationship with respect to the axis Ax1, a flow direction of the fuel (F1) that flows to the inner side in the radial direction of the nozzle bottom portion 12 along the valve seat 14 changes by an angle corresponding to a twist angle, and the fuel flows from the inside of the suction chamber 15 to the outside of the nozzle 10 along the nozzle hole axis Axh1 (F2).

Next, for the nozzle holes 62, 63, 65, and 66 in which the nozzle hole axis Axh1 has the twisted relationship with respect to an inflow from upstream, a method for defining the inner wall intersection point Pw1, the distance LA, and the nozzle hole length LB will be described. In a gasoline engine including an ignition plug, it is necessary to have a nozzle hole toward an ignition source and a nozzle hole that forms uniform spray in a cylinder even if the nozzle hole is mounted on a side as well as on a center, and therefore, injection directions of all nozzle holes rarely coincide with a radial direction of a valve axis (the axis Ax1), and at least one of the nozzle holes has a twist.

Figure 7:
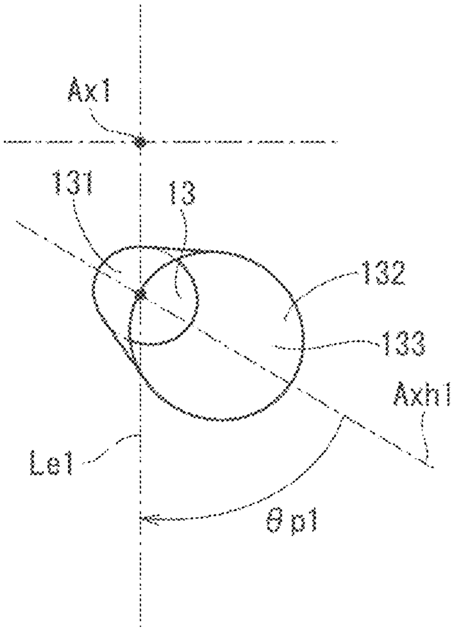
FIG. 7 is a diagram showing a method for defining an inner wall intersection point, a distance from an outlet opening portion to the inner wall intersection point, and a nozzle hole length with respect to the nozzle hole of the fuel injection valve according to the first embodiment.
Figure 8:
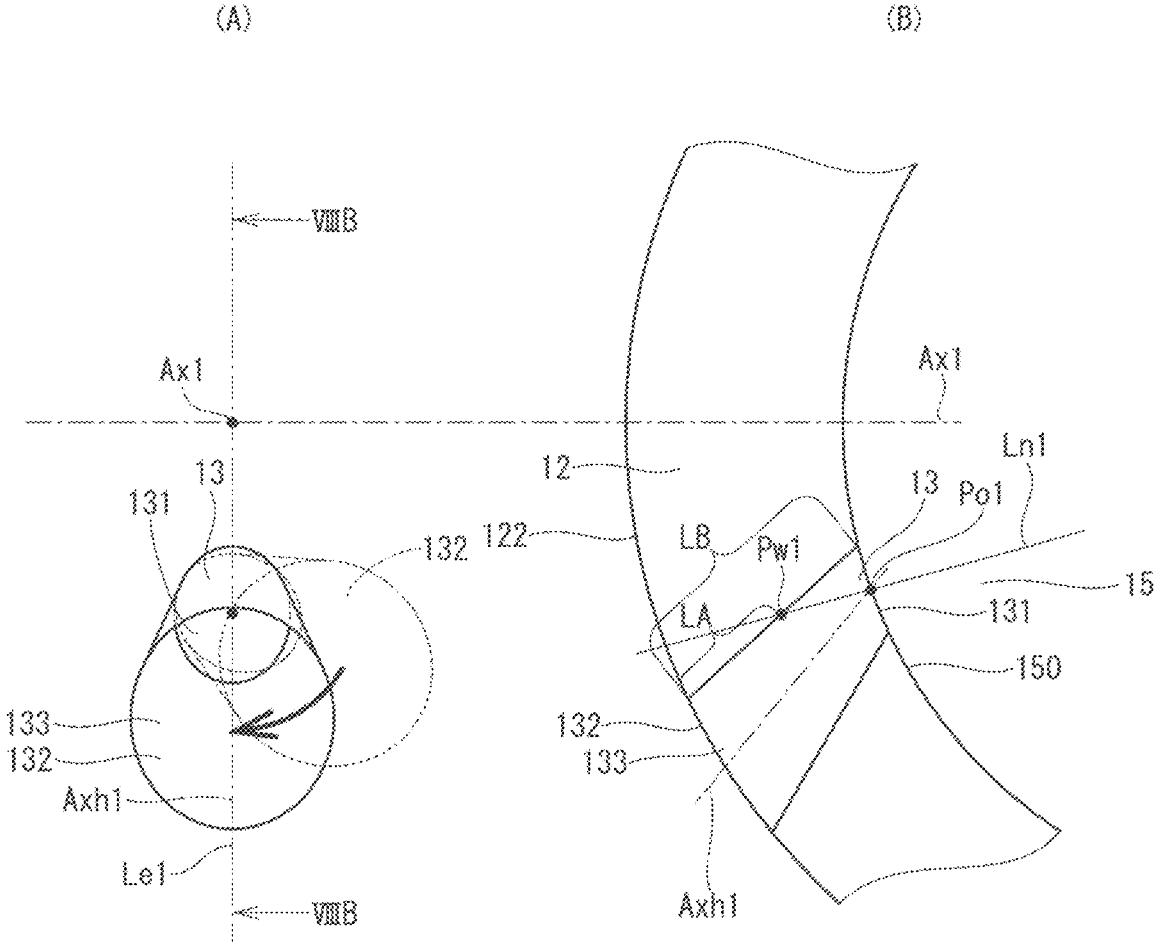
FIG. 8 is a diagram showing the method for defining the inner wall intersection point, the distance from the outlet opening portion to the inner wall intersection point, and the nozzle hole length with respect to the nozzle hole of the fuel injection valve according to the first embodiment.

As shown in FIGS. 7 and 8, the inlet opening portion 131 is fixed such that a projection angle θp1 between the nozzle hole axis Axh1 and a line Le1, which is an extension of a line connecting the axis Ax1 of the nozzle cylinder portion 11 and the center of the inlet opening portion 131, is 0°, and in a cross section of an imaginary plane formed on a locus of the nozzle hole axis Axh1 when the nozzle hole axis Axh1 is rotated around the axis Ax1 of the nozzle cylinder portion 11, the intersection point between the normal line Ln1 and the nozzle hole inner wall 133 is defined as the inner wall intersection point Pw1, the distance from the outlet opening portion 132 to the inner wall intersection point Pw1 is defined as LA, and the length between the inlet opening portion 131 and the outlet opening portion 132 of the nozzle hole inner wall 133 on the side where the inner wall intersection point Pw1 is formed is defined as the nozzle hole length LB.

Next, an effect of the fuel injection valve 1 of the present embodiment will be described. As described above, in the present embodiment, the seat throttle area As is larger than the nozzle hole throttle area Ah. Therefore, when the seat portion 31 of the needle 30 is separated from the valve seat 14, the fuel flows into the suction chamber 15 in a state where there is almost no throttle by the seat portion 31 and the pressure loss is small. Accordingly, a pressure vector acts in the direction of the normal line Ln1. Therefore, the fuel is injected in the direction of the normal line Ln1. In the present embodiment, the normal line Ln1 and the nozzle hole inner wall 133 intersect, Therefore, a liquid film of the fuel is formed in the nozzle hole 13.

FIG. 6 shows a state in the suction chamber 15 and the nozzle hole 13 when the seat portion 31 of the needle 30 is most separated from the valve seat 14. In FIG. 6, hatching of a cross section of a member is omitted in order to avoid complicating the figure. In the figure, the darker the shaded area, the higher the pressure. As shown in FIG. 6, it can be seen that a pressure of the suction chamber 15 is high, and a pressure in a portion of the nozzle hole 13 on the side of the inlet opening portion 131 is higher than that of the inner wall intersection point Pw1 which is the intersection point between the normal line Ln1 and the nozzle hole inner wall 133. As described above, in the present embodiment, a fuel flow generated at the inlet opening portion 131 can be collided with the nozzle hole inner wall 133, and the pressure in the suction chamber 15 can be efficiently converted into energy for forming the liquid film, and the fuel can be atomized. Next, the effect of the fuel injection valve 1 of the present embodiment is shown by an atomization index based on a Fraser model. In a liquid film splitting theory of Fraser, a volume mean particle size $D_{30}$ after splitting of the fuel is calculated by the following Equation 1.

$$D_{30}=3.78(2/E)^{1/3}(hr/V^2)^{1/3}(\sigma^2/\rho_L\rho_a)^{1/6} \quad \text{Equation 1}$$

Figure 9:
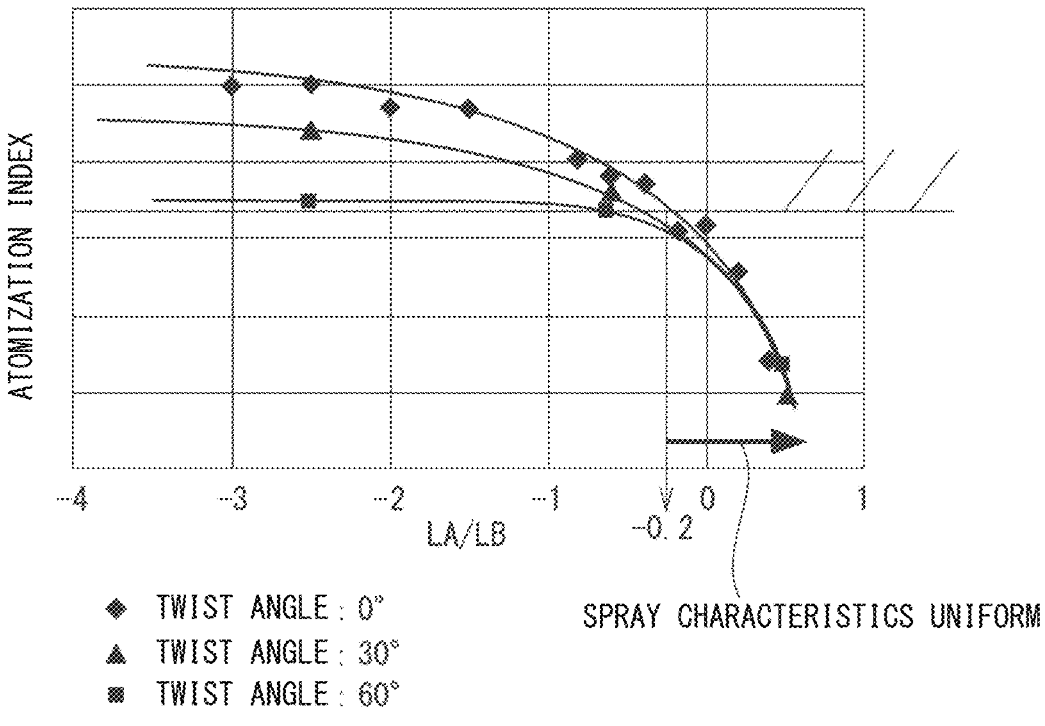
FIG. 9 is a diagram showing a relationship between an atomization index and a position of the inner wall intersection point with respect to the nozzle hole of the fuel injection valve according to the first embodiment.

In Equation 1, E, h, r, V, σ, $\rho_L$, and $\rho_a$ are an experimental constant, a liquid film thickness, a distance, a liquid film velocity, a surface tension, a fuel density, and an air density, respectively. When $(hr/V^2)^{1/3}$ of the above Equation 1 is defined as the atomization index, a relationship between the atomization index and LA/LB for the nozzle hole 13 whose projection angle θp1, that is, a twist angle (see FIG. 4) is 0°, 30°, and 60° is as shown in FIG. 9. FIG. 9 shows a value obtained by analysis. The liquid film thickness and the liquid film velocity are required in the analysis. The atomization index is a value based on the liquid film velocity (spray rate) and the liquid film thickness, and the smaller the atomization index, the finer the fuel spray is.

As shown in FIG. 9, it can be seen that in a range of LA/LB>−0.2, the atomization index is small at any twist angle, the fuel spray is equally atomized, and spray characteristics are made uniform. Even if LA is a negative value, it is effective because there is a range of spraying.

In the present embodiment, the nozzle hole 13 is provided such that LA/LB>−0.2, Therefore, the fuel spray injected from the nozzle hole 13 can be effectively atomized.

In the present embodiment, since As>Ah, the fuel in the suction chamber 15 is not easily affected by the inflow from the valve seat 14, and a flow velocity is generated in the direction of the normal line Ln1 at the inlet opening portion 131, Even in the nozzle hole 13 in which the nozzle hole axis Axh1 has a twisted relationship with respect to the axis Ax1 of the nozzle cylinder portion 11, since the flow velocity depends on kinetic energy when colliding with the nozzle hole inner wall 133, the flow velocity can be arranged by the atomization index (depending on kinetic energy in X-, Y-, and Z-directions).

As described above, in the present embodiment, when the needle 30 is most separated from the valve seat 14, the minimum value of the flow channel area between the valve seat 14 and the needle 30 is set as the seat throttle area As, the minimum value of the flow channel area of the nozzle hole 13 is set as the nozzle hole throttle area Ali, and As>Ah. The nozzle hole 13 is provided such that the normal line Ln1 of the suction wall surface 150 at the opening intersection point Po1, which is the intersection point between the nozzle hole axis Axh1 and the inlet opening portion 131, intersects the nozzle hole inner wall 133 or the imaginary inner wall VW1 extending the nozzle hole inner wall 133 to the side opposite from the nozzle cylinder portion 11.

In the present embodiment, since As>Ah, the fuel is not throttled between the valve seat 14 and the needle 30, and flows into the suction chamber 15 in a state where the pressure loss is small. Therefore, the fuel flowing into the suction chamber 15 flows along the normal line Ln1 of the suction wall surface 150 at the opening intersection point Po1 which is the intersection point between the nozzle hole axis Axh1 and the inlet opening portion 131, and collides with the nozzle hole inner wall 133. When a high-pressure fuel collides with the nozzle hole inner wall 133, a liquid film is effectively formed in the nozzle hole 13. Therefore, the pressure energy of the fuel is capable of being utilized to effectively atomize fuel spray Fo injected from the nozzle hole 13.

In the present embodiment, in the cross section along the imaginary plane Sc1 including the nozzle hole axis Axh1, when the distance from the outlet opening portion 132 to the inner wall intersection point Pw1, which is the intersection point between the normal line Ln1 and the nozzle hole inner wall 133 or the imaginary inner wall VW1, is set as LA, and the nozzle hole length, which is the length between the inlet opening portion 131 and the outlet opening portion 132 of the nozzle hole inner wall 133 on the side where the inner wall intersection point Pw1 is formed, is set as LB, the nozzle hole 13 is provided such that LA/LB>−0.2. Therefore, the high-pressure fuel can be effectively collided with the nozzle hole inner wall 133, and the liquid film can be effectively formed in the nozzle hole 13. Therefore, the fuel spray Fo injected from the nozzle hole 13 can be atomized more effectively.

In the present embodiment, the normal line Ln1 intersects the nozzle hole inner wall 133 on the side of the axis Ax1 of the nozzle cylinder portion 11 of the two nozzle hole inner walls 133 shown in the cross section along the imaginary plane Sc1. Even with such a configuration, when the high-pressure fuel collides with the nozzle hole inner wall 133, the liquid film is effectively formed in the nozzle hole 13. Therefore, the pressure energy of the fuel is capable of being utilized to effectively atomize fuel spray Fo injected from the nozzle hole 13.

Second Embodiment

Figure 10:
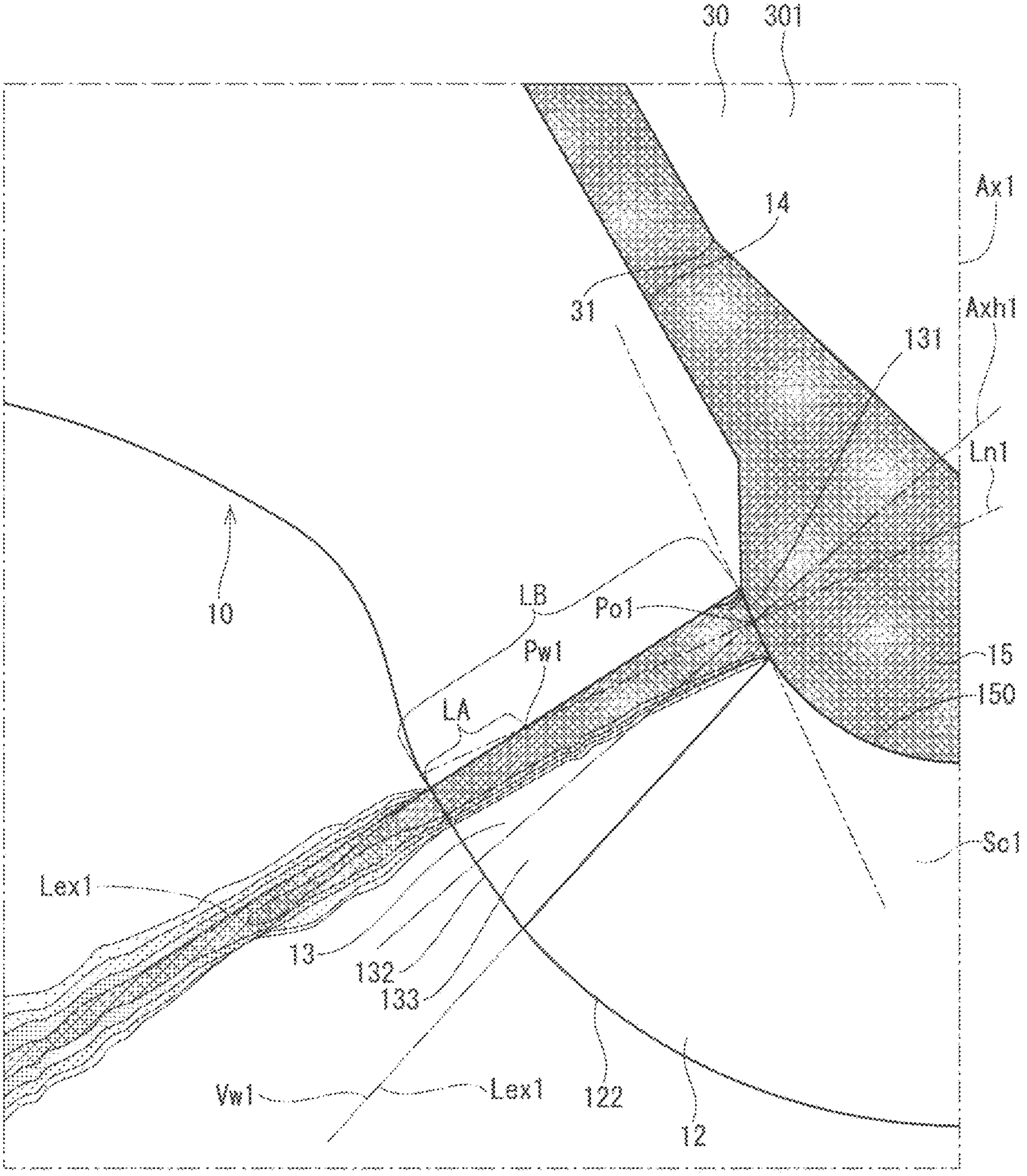
FIG. 10 is a cross-sectional view showing a nozzle hole of a fuel injection valve according to a second embodiment and a vicinity thereof.

A part of a fuel injection valve according to a second embodiment is shown in FIG. 10. In the second embodiment, a configuration of the nozzle 10 is different from that in the first embodiment.

In the present embodiment, the shape of the suction wall surface 150 on which the inlet opening portion 131 is provided is different from that of the first embodiment. Therefore, the normal line Ln1 intersects the nozzle hole inner wall 133, on the side opposite from the axis Ax1 of the nozzle cylinder portion 11, that is, on the side of the valve seat 14, of the two nozzle hole inner walls 133 shown in the cross section along the imaginary plane Sc1 (FIG. 10). Even with such a configuration, when the high-pressure fuel collides with the nozzle hole inner wall 133, the liquid film is effectively formed in the nozzle hole 13. Therefore, the pressure energy of the fuel is capable of being utilized to effectively atomize fuel spray Fo injected from the nozzle hole 13.

The second embodiment has the same configuration as the first embodiment except for the above points.

Third Embodiment

Figure 11:
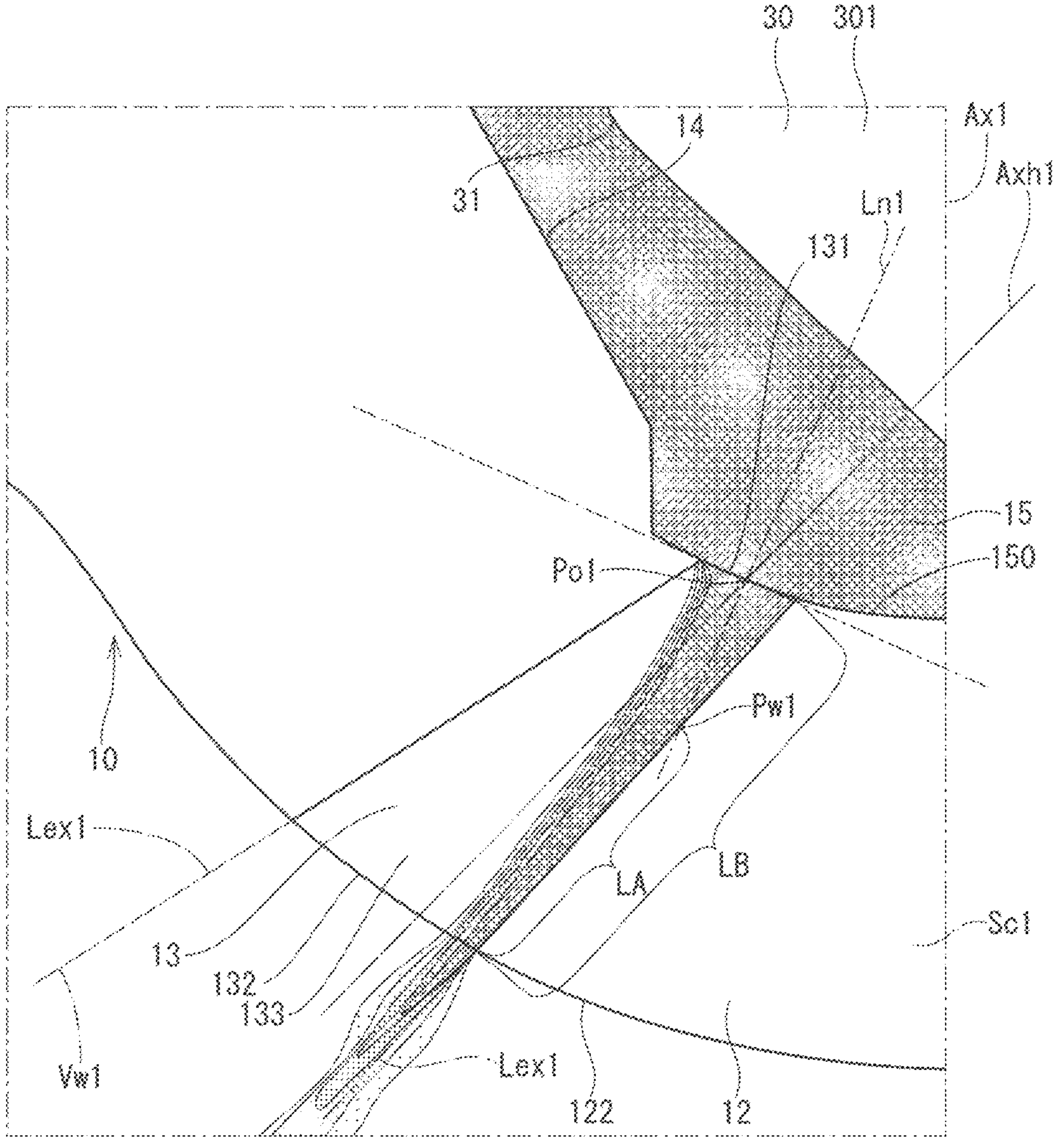
FIG. 11 is a cross-sectional view showing a nozzle hole of a fuel injection valve according to a third embodiment and a vicinity thereof.

A part of a fuel injection valve according to a third embodiment is shown in FIG. 11. In the third embodiment, the configuration of the nozzle 10 is different from that in the first embodiment.

In the present embodiment, a curvature of the suction wall surface 150 in the cross section including the axis Ax1 of the nozzle cylinder portion 11 is different from that in the first embodiment. Therefore, in the present embodiment, a position of the inner wall intersection point Pw1 which is the intersection point between the normal line Ln1 and the nozzle hole inner wall 133 is different from that in the first embodiment. In the present embodiment, as in the first embodiment, the normal line Ln1 intersects the nozzle hole inner wall 133 on the side of the axis Ax1 of the nozzle cylinder portion 11 of the two nozzle hole inner walls 133 shown in the cross section along the imaginary plane Sc1. Even with such a configuration, when the high-pressure fuel collides with the nozzle hole inner wall 133, the liquid film is effectively formed in the nozzle hole 13. Therefore, the pressure energy of the fuel is capable of being utilized to effectively atomize fuel spray Fo injected from the nozzle hole 13.

The third embodiment has the same configuration as the first embodiment except for the above points.

Fourth Embodiment

Figure 12:
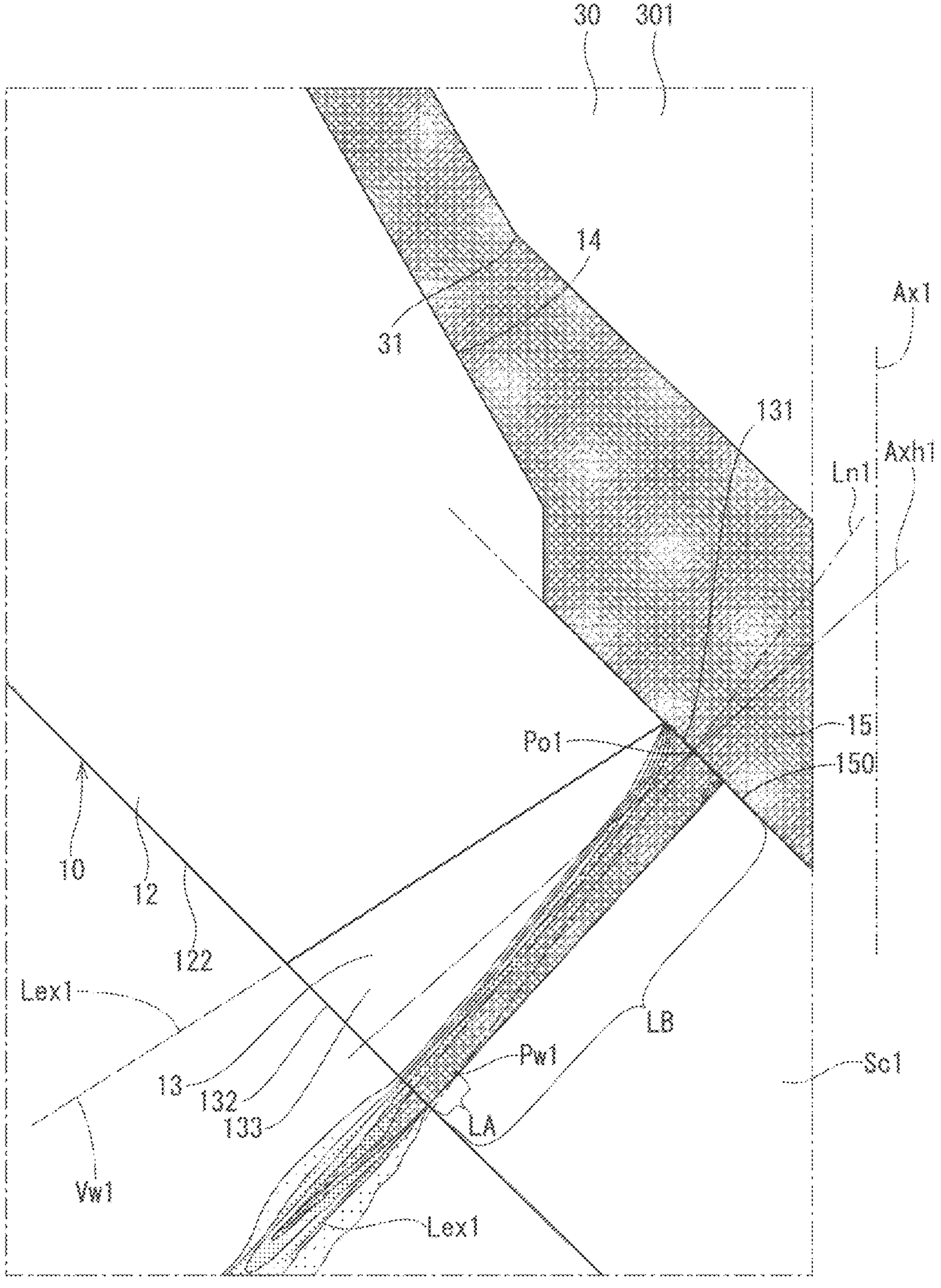
FIG. 12 is a cross-sectional view showing a nozzle hole of a fuel injection valve according to a fourth embodiment and a vicinity thereof.

A part of a fuel injection valve according to a fourth embodiment is shown in FIG. 12. In the fourth embodiment, the configuration of the nozzle 10 is different from that in the first embodiment.

In the present embodiment, the suction wall surface 150 is provided in a tapered shape so as to approach the axis Ax1 of the nozzle cylinder portion 11 from the nozzle cylinder portion 11 toward the nozzle bottom portion 12. The inlet opening portion 131 is provided on the tapered suction wall surface 150. The normal line Ln1 intersect the nozzle hole inner wall 133 on the side of the axis Ax1 of the nozzle cylinder portion 11 of the two nozzle hole inner walls 133 shown in the cross section along the imaginary plane Sc1 The fourth embodiment has the same configuration as the first embodiment except for the above points.

Fifth Embodiment

Figure 13:
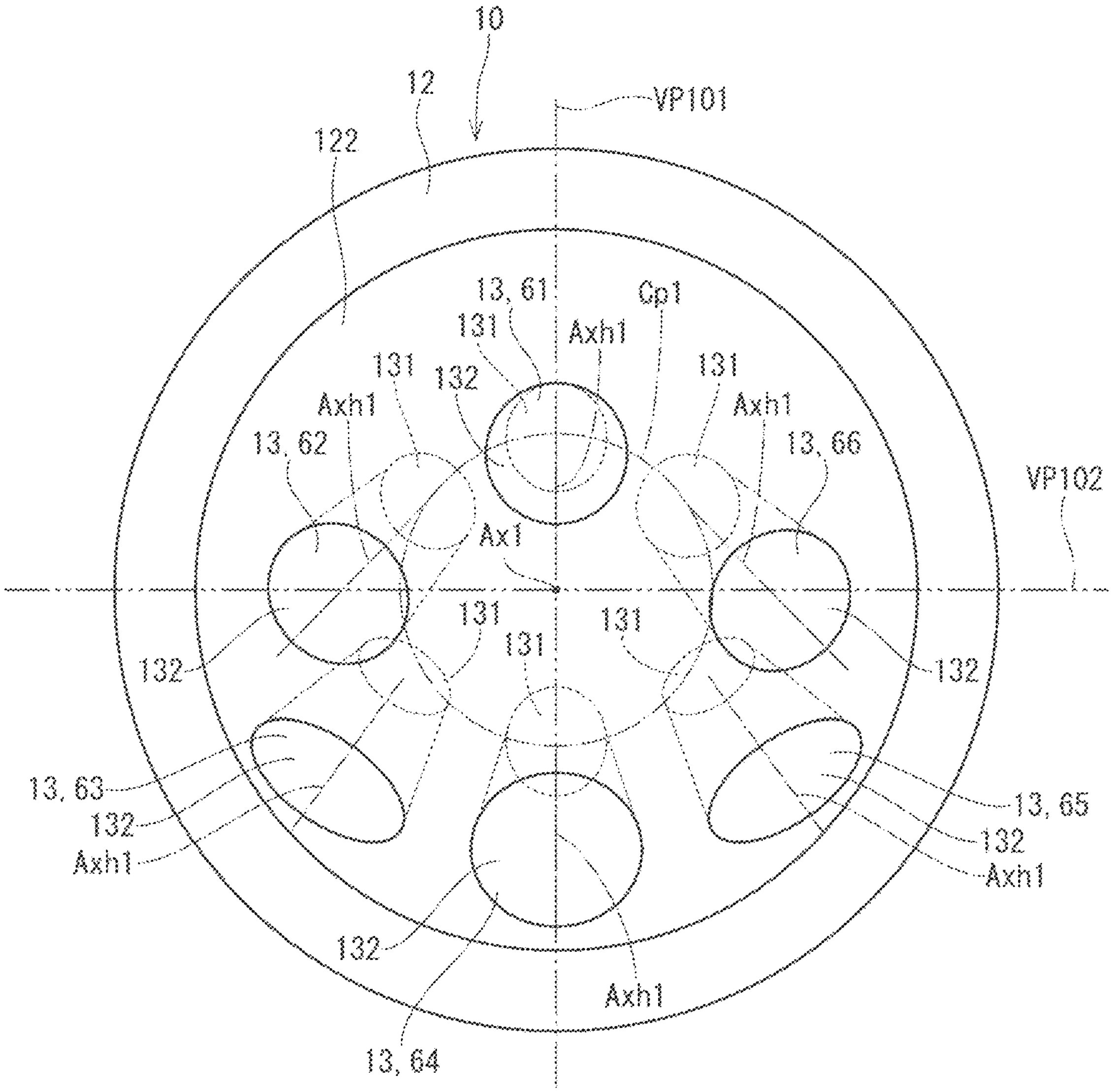
FIG. 13 is a diagram showing a nozzle hole of a fuel injection valve according to a fifth embodiment and a vicinity thereof.

A part of a fuel injection valve according to a fifth embodiment is shown in FIG. 13, In the fifth embodiment, the configuration of the nozzle hole 13 is different from that in the first embodiment.

In the present embodiment, the centers of the inlet opening portions 131 of the nozzle holes 61, 62, 64, and 66 are disposed on the pitch circle Cp1 centered on the axis Ax1. The centers of the inlet opening portions 131 of the nozzle holes 63 and 65 are disposed outside the pitch circle Cp1.

In the present embodiment, as in the first embodiment, As>Ah, and since a cross flow of the fuel in the suction chamber 15 is not used, a formation position of the inlet opening portion 131 on the suction wall surface 150 can be freely set. That is, even if the center of the inlet opening portion 131 of the nozzle hole 13 is not disposed on the pitch circle Opt atomization of multiple sprays can be realized.

Sixth Embodiment

Figure 14:
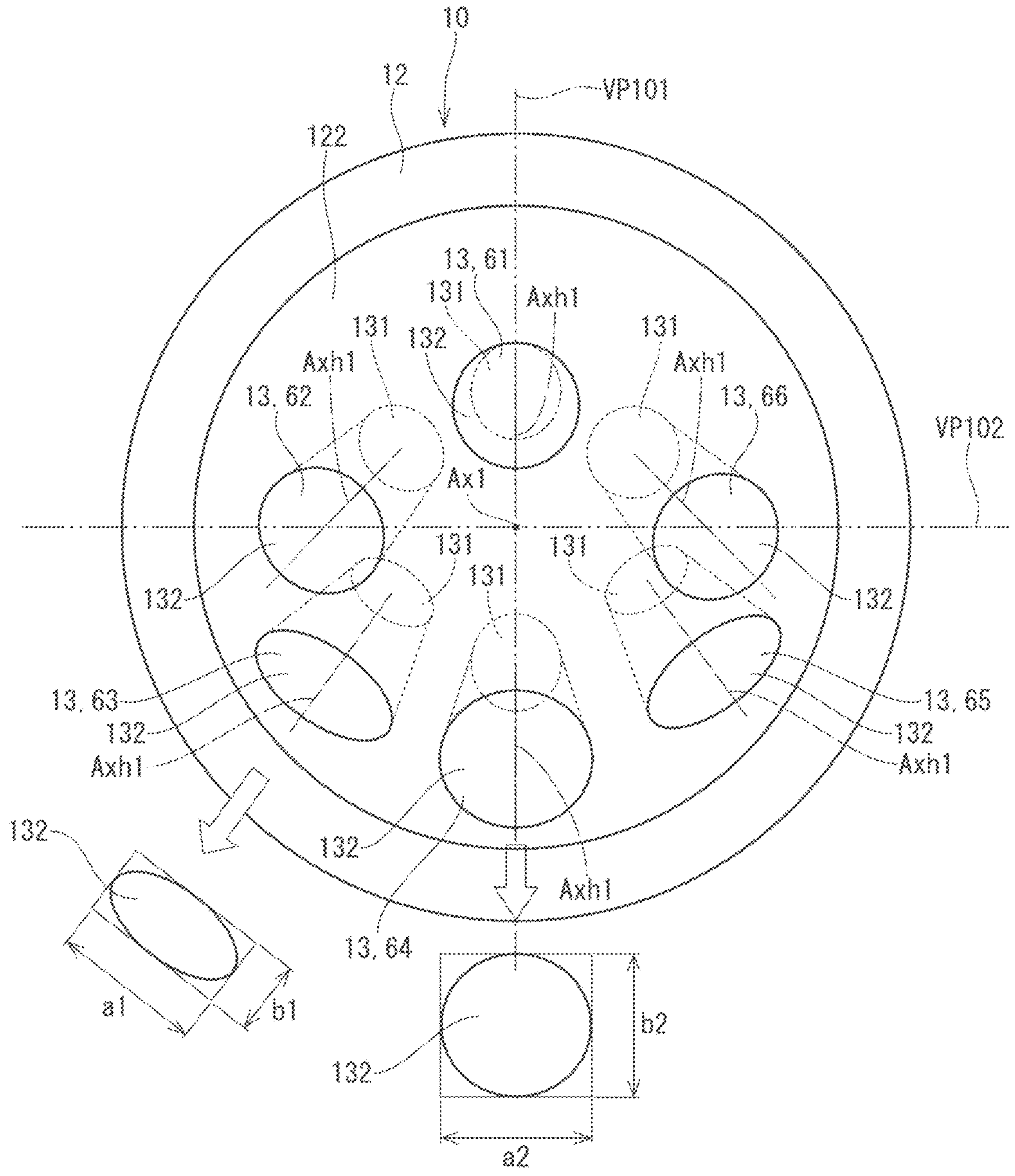
FIG. 14 is a diagram showing a nozzle hole of a fuel injection valve according to a sixth embodiment and a vicinity thereof.
Figure 15:
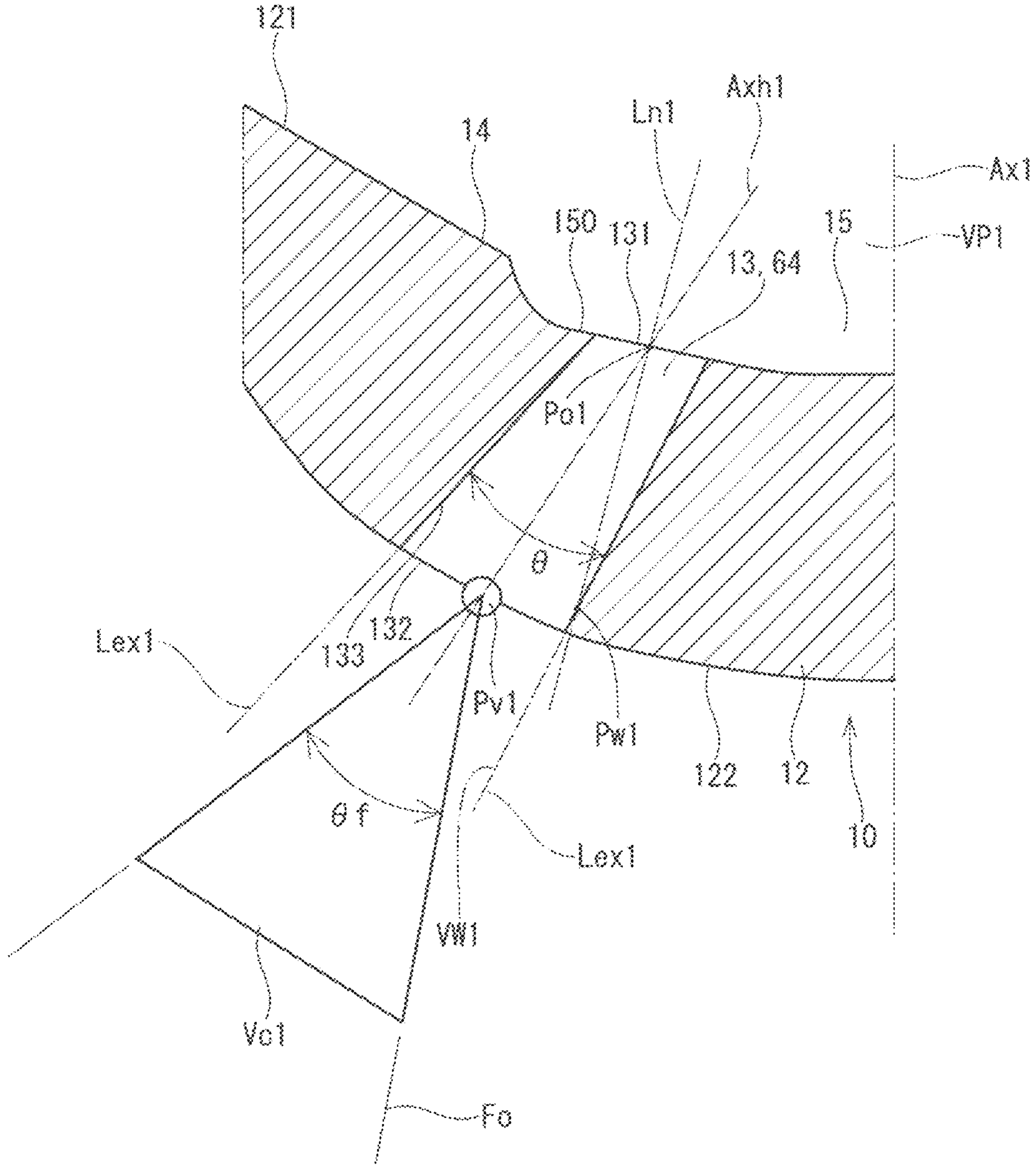
FIG. 15 is a cross-sectional view including a perfect circular nozzle hole of the fuel injection valve according to the sixth embodiment.

A part of a fuel injection valve according to a sixth embodiment is shown in FIGS. 14 and 15, In the sixth embodiment, the configuration of the nozzle hole 13 and the like are different from those in the first embodiment.

A pressure of the fuel in the fuel passage 100 assumed when the fuel injection valve 1 of the present embodiment is used is, for example, about 20 MPa.

Next, the nozzle hole 13 of the present embodiment will be described in detail. In FIG. 15, the needle 30 is not shown.

As shown in FIG. 15, in a cross section including the nozzle hole axis Axh1, an angle formed by the two nozzle hole inner walls 133 of one nozzle hole 13 is referred to as an "nozzle hole opening angle". In the cross section including the nozzle hole axis Axh1, an angle formed by two contours of the fuel spray Fo injected from the one nozzle hole 13 is referred to as a "fuel spray opening angle".

In the nozzle holes 63 and 65, a ratio of the longest diameter a1 to the shortest diameter b1 of the outlet opening portions 132 is larger than 1. Therefore, the shape of the outlet opening portions 132 of the nozzle holes 63 and 65 is an elliptical shape, that is, a non-perfect circular shape when viewed from a direction of the nozzle hole axis Axh1 (see FIG. 14). The nozzle holes 63 and 65 are referred to as "non-perfect circular nozzle holes". The nozzle holes 63 and 65 are appropriately referred to as "oval nozzle holes" or "elliptical nozzle holes". The "oval nozzle hole" is a nozzle hole in which the shape of the outlet opening portion 132 is non-perfect circular, and is an oval shape such as an egg shape, an ellipse, or a track shape. An ellipse is a circle with a constant sum of distances from two focal points. In the present embodiment, the shape of the outlet opening portions 132 of the nozzle holes 63 and 65 is an ellipse having two focal points. Hereinafter, when the "oval nozzle hole" is used, the "oval nozzle hole" includes the nozzle hole 13 in which the shape of the outlet opening portion 132 is an oval shape, an ellipse, or a track shape. The "non-perfect circular nozzle hole" includes an "oval nozzle hole", an "elliptical nozzle hole", and a "track nozzle hole" The "longest diameter" means the longest width among widths of the shape, and corresponds to a length of a major axis in the shape of the outlet opening portions 132 of the nozzle holes 63 and 65. The "shortest diameter" means the shortest width among the widths of the shape, and corresponds to a length of a minor axis in the shape of the outlet opening portions 132 of the nozzle holes 63 and 65.

In the nozzle holes 61, 62, 64, and 66, a ratio of the longest diameter a2 to the shortest diameter b2 of the outlet opening portion 132 is 1. Therefore, in the nozzle holes 61, 62, 64, and 66, the shape of the outlet opening portion 132 is a perfect circular shape when viewed from the direction of the nozzle hole axis Axh1 (see FIG. 14). The nozzle holes 61, 62, 64, and 66 are referred to as "perfect circular nozzle holes".

As described above, in the present embodiment, one or more (two) nozzle holes 13 among the multiple nozzle holes 13 are non-perfect circular nozzle holes which are nozzle holes 13 in which a ratio of the longest diameter to the shortest diameter of the outlet opening portion 132 is larger than 1.

Figure 16:
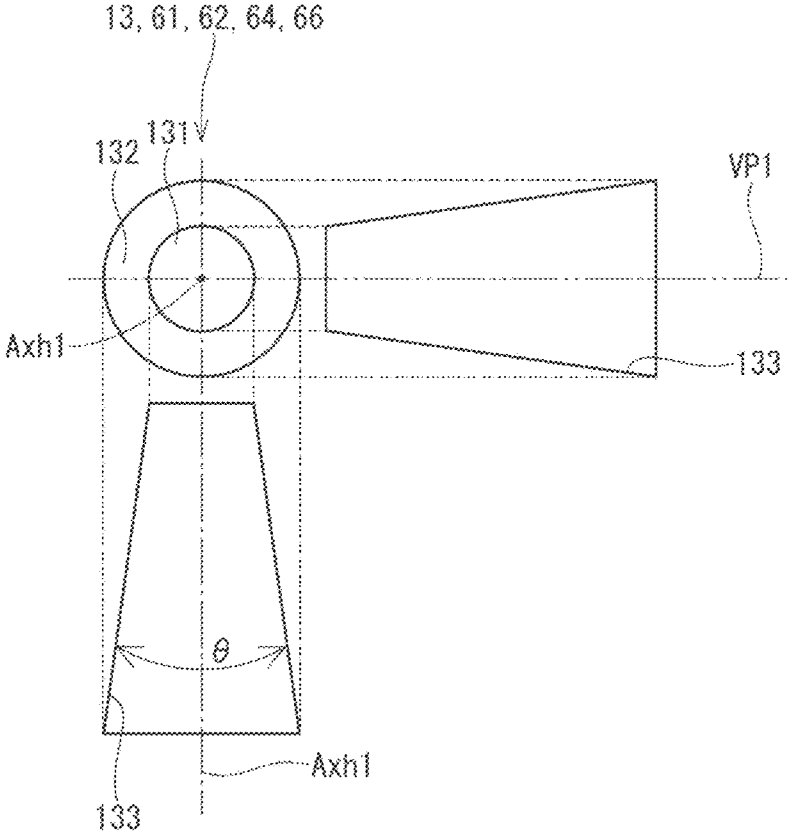
FIG. 16 is a schematic view showing the perfect circular nozzle hole of the fuel injection valve according to the sixth embodiment.

As shown in FIG. 16, in the nozzle holes 61, 62, 64, and 66 as the perfect circular nozzle holes, the shapes of the inlet opening portion 131 and the outlet opening portion 132 are perfect circular shapes. The inlet opening portion 131 and the outlet opening portion 132 are provided coaxially. Therefore, in a cross section formed by a first imaginary plane VP1 which is an imaginary plane including the nozzle hole axis Axh1 an angle θ formed by the nozzle hole inner wall 133 is constant in the circumferential direction of the outlet opening portion 132.

Figure 17:
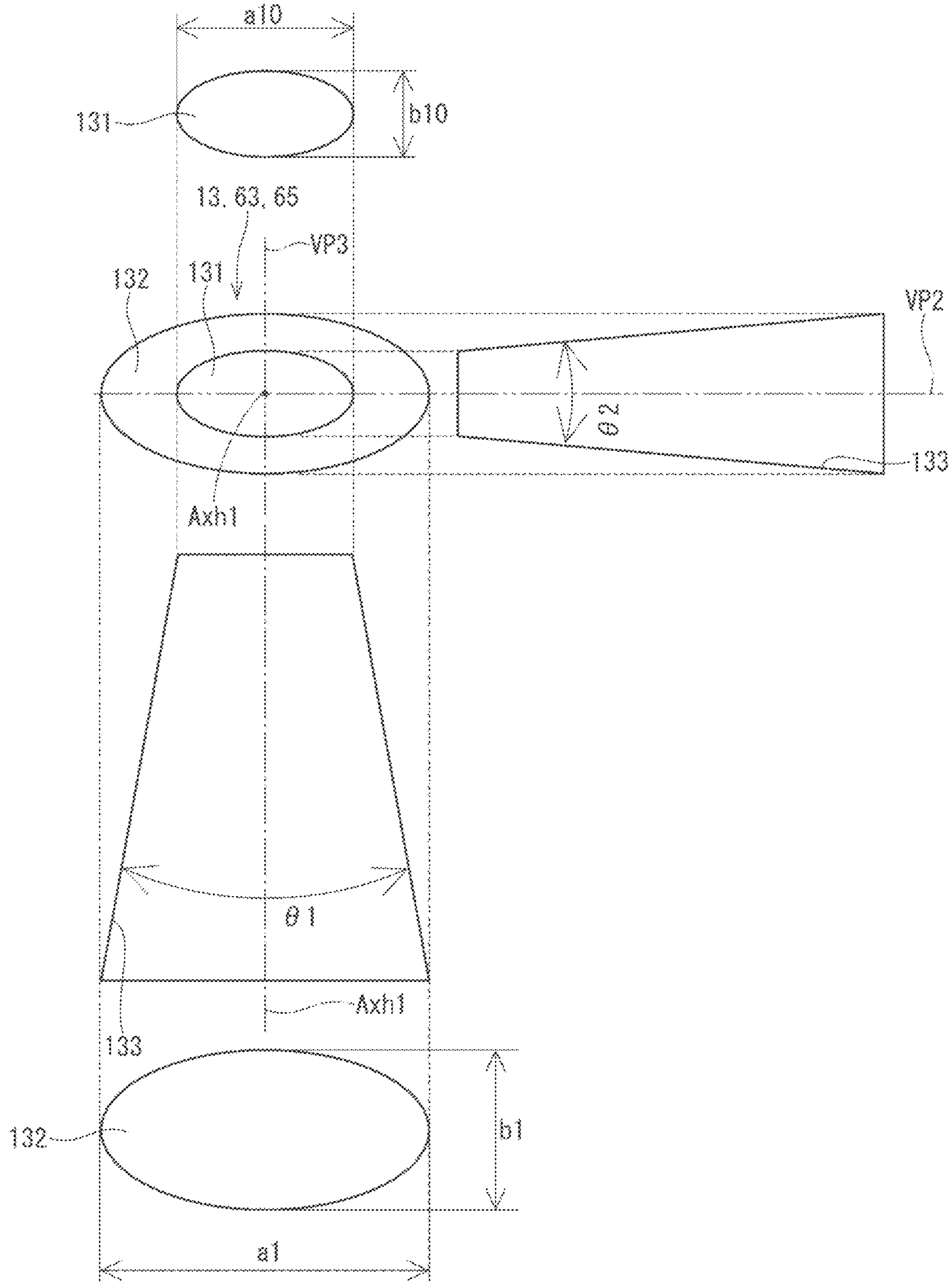
FIG. 17 is a schematic view showing a non-perfect circular nozzle hole of the fuel injection valve according to the sixth embodiment.

As shown in FIG. 17, in the nozzle holes 63 and 65 as the non-perfect circular nozzle holes, the shapes of the inlet opening portion 131 and the outlet opening portion 132 are elliptical shapes. The inlet opening portion 131 and the outlet opening portion 132 are provided coaxially such that directions of the major axis and the minor axis coincide with each other. Therefore, when in a cross section formed by a second imaginary plane VP2 which is an imaginary plane including the nozzle hole axis Axh1, an angle that maximizes the angle formed by the nozzle hole inner wall 133 is set as θ1, and in a cross section formed by a third imaginary plane VP3 which is an imaginary plane including the nozzle hole axis Axh1, an angle that minimizes the angle formed by the nozzle hole inner wall 133 is set as θ2, the second imaginary plane VP2 and the third imaginary plane VP3 are orthogonal to each other.

When a length of a major diameter of the outlet opening portion 132 is set as a1 and a length of a minor diameter of the outlet opening portion 132 is set as b1, and a length of a major diameter of the inlet opening portion 131 is set as a10 and a length of a minor diameter of the inlet opening portion 131 is set as b10, flatness of the nozzle holes 63 and 65 as the non-perfect circular nozzle holes is a1/b1=a10/b10. That is, the non-perfect circular nozzle hole has an elliptical shape in which the inlet opening portion 131 and the outlet opening portion 132 have the same flatness. The "major diameter" means the longest width among widths of the shape, and corresponds to the "major axis" in an ellipse. The "minor diameter" means the shortest width among the widths of the shape, and corresponds to the "minor axis" in the ellipse.

Figure 18:
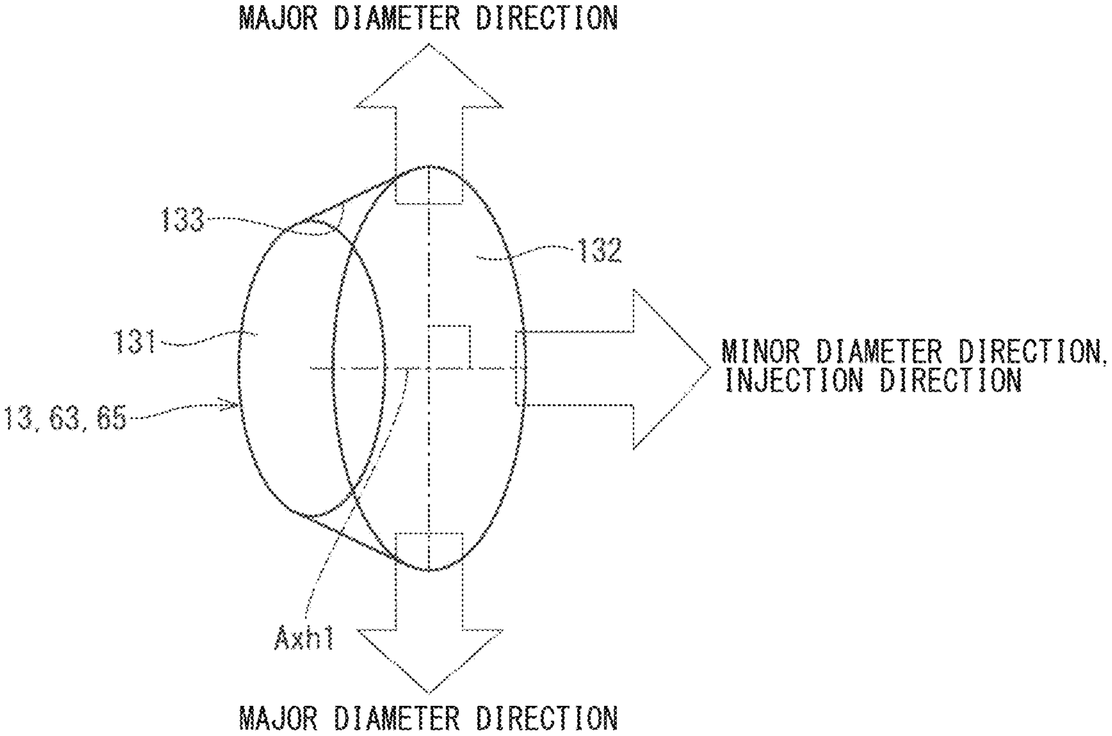
FIG. 18 is a schematic view showing a non-perfect circular nozzle hole of the fuel injection valve according to the sixth embodiment.
Figure 19:
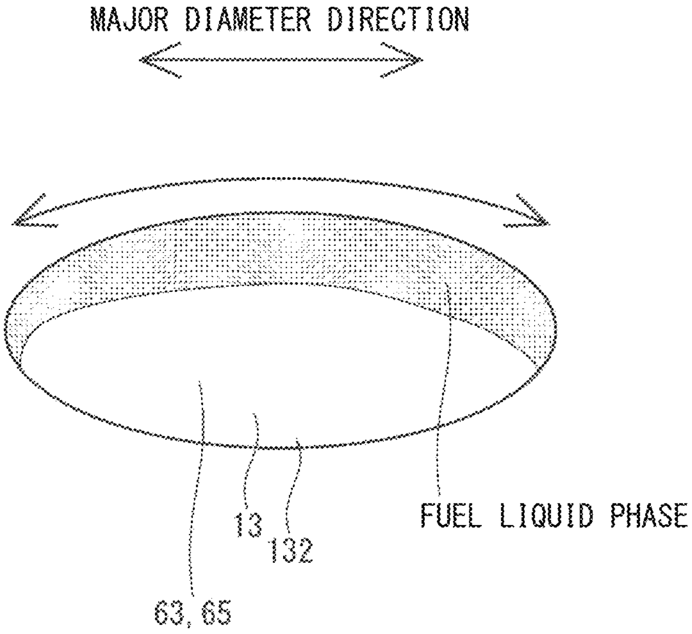
FIG. 19 is a diagram showing a non-perfect circular nozzle hole during fuel injection of the fuel injection valve according to the sixth embodiment.

As shown in FIG. 18, the nozzle holes 63 and 65 as the non-perfect circular nozzle holes are provided such that a minor diameter direction of the outlet opening portion 132 is along an injection direction of a fuel injected from the non-perfect circular nozzle holes. When the minor diameter direction and the injection direction coincide with each other, a minor axis is on an imaginary plane passing through the nozzle hole axis Axh1 and parallel to the axis Ax1, Even if a degree of variation due to processing is included, the direction is expressed as "along", The "minor diameter direction" corresponds to a direction along the minor diameter, that is, the minor axis of the outlet opening portion 132 when viewed from a direction of the axis Ax1 of the nozzle cylinder portion 11. The "injection direction of a fuel" corresponds to a direction along the nozzle hole axis Axh1 when viewed from the direction of the axis Ax1 of the nozzle cylinder portion 11. In FIGS. 18 and 19, the "major diameter direction" corresponds to a direction along the major diameter, that is, the major axis of the outlet opening portion 132.

As shown in FIG. 15, a nozzle hole opening angle of a perfect circular nozzle hole (64), which is the nozzle hole 13 in which a ratio of the longest diameter to the shortest diameter of the outlet opening portion 132 is 1 among the multiple nozzle holes 13, is set as θ(deg), an opening angle of the fuel spray Fo injected from the perfect circular nozzle hole is set as θf(deg), and an average pressure of the fuel in the fuel passage 100 when the fuel is injected from the perfect circular nozzle hole is set as P(MPa).

An imaginary cone, in which an intersection point between the nozzle hole axis Axh1 and the outlet opening portion 132 of the perfect circular nozzle hole is set as a vertex Pv1 and an angle formed by two generatrices in the cross section formed by the first imaginary plane VP1 including the nozzle hole axis Axh1 of the perfect circular nozzle hole is set as $$\text{“}\theta f=\theta+0.5\times P\hat{\ }0.6 \qquad \text{Equation 2”},$$

is defined as an imaginary perfect cone Vc1 (see FIG. 15). "^" represents a power. "0.5×P^0.6" in the above Equation 2 is a difference between the "nozzle hole opening angle" (θ) and the "fuel spray opening angle" (θf=θ+0.5×P^0.6), and corresponds to "the fuel spray opening angle increased by a fuel pressure in the fuel passage 100". When P is 20 (MPa), 0.5×P^0.6 is about 3.0.

Figure 20:
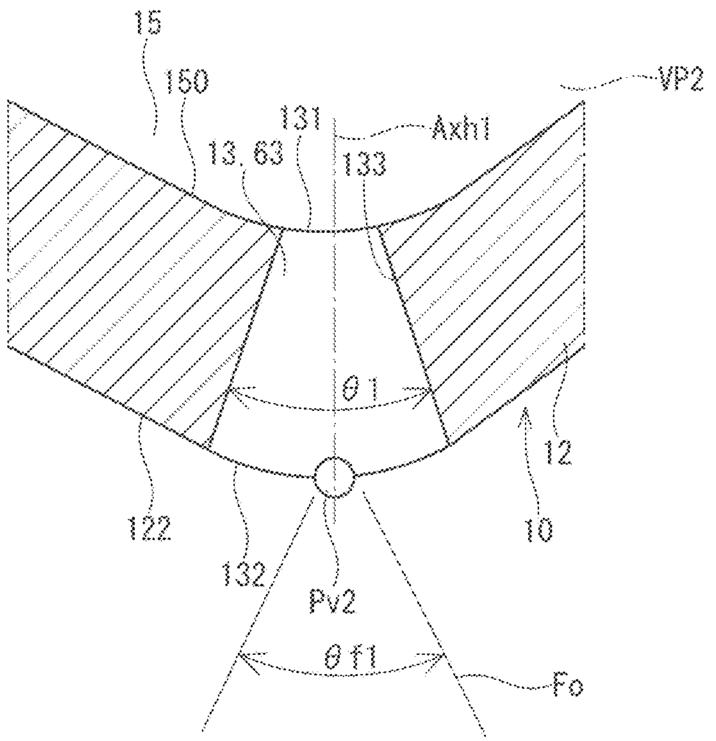
FIG. 20 is a cross-sectional view including the non-perfect circular nozzle hole of the fuel injection valve according to the sixth embodiment.
Figure 21:
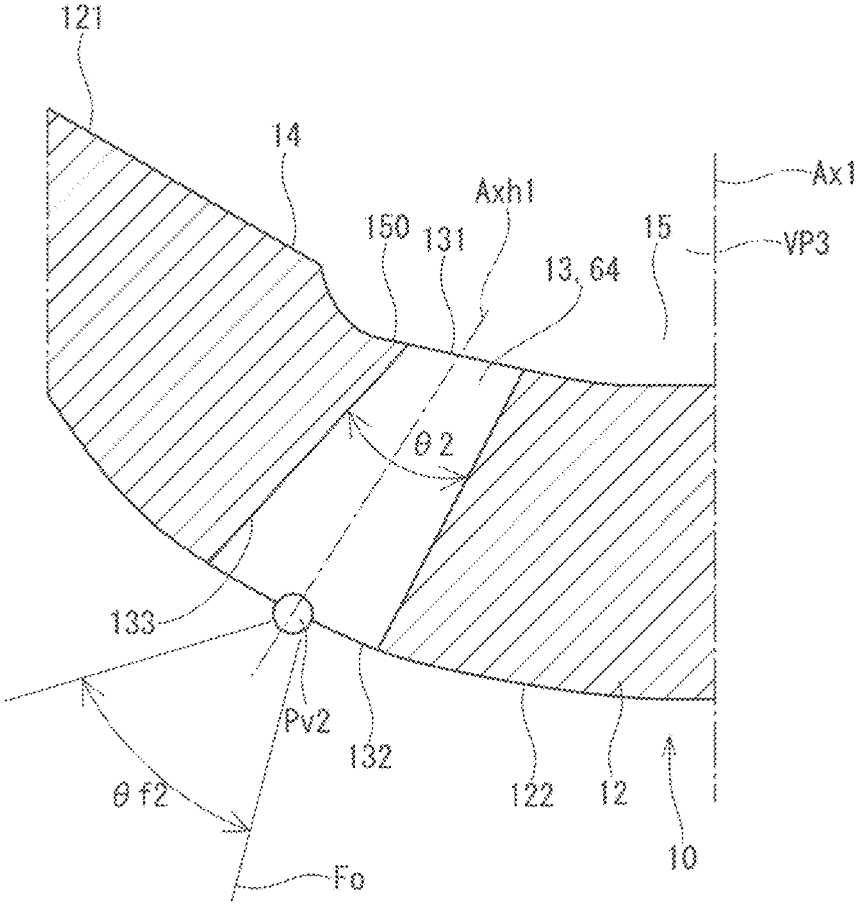
FIG. 21 is a cross-sectional view including the non-perfect circular nozzle hole of the fuel injection valve according to the sixth embodiment.

As shown in FIGS. 20 and 21, a maximum nozzle hole opening angle of a non-perfect circular nozzle hole (63) is set as θ1 (deg), a minimum nozzle hole opening angle is set as θ2 (deg), a maximum opening angle of the fuel spray Fo injected from the non-perfect circular nozzle hole is set as θf1 (deg), and a minimum opening angle of the fuel spray Fo injected from the non-perfect circular nozzle hole is set as θf2 (deg).

An intersection point between the nozzle hole axis Axh1 and the outlet opening portion 132 of the non-perfect circular nozzle hole is set as a vertex Pv2, and in the cross section formed by the second imaginary plane VP2 including the nozzle hole axis Axh1 of the non-perfect circular nozzle hole, an angle at which the angle formed by the two generatrices is maximized is set as $$\text{“}\theta f1=\theta 1+0.5\times P\hat{\ }0.6+17\times e\hat{\ }(-0.13\times\theta 1) \qquad \text{Equation 3”}$$

(see FIG. 20).

"17×e^(−0.13×81)" in the above Equation 3 is a difference between a sum, which is obtained by adding the "nozzle hole opening angle" (θ1) and the "fuel spray opening angle increased by the fuel pressure in the fuel passage 100" (0.5×P^0.6), and the "fuel spray opening angle" (θf1=θ1+

0.5×P^0.6+17×e^(−0.13×81)), and corresponds to the "fuel spray opening angle increased due to a shape of the non-perfect circular nozzle hole".

Figure 22:
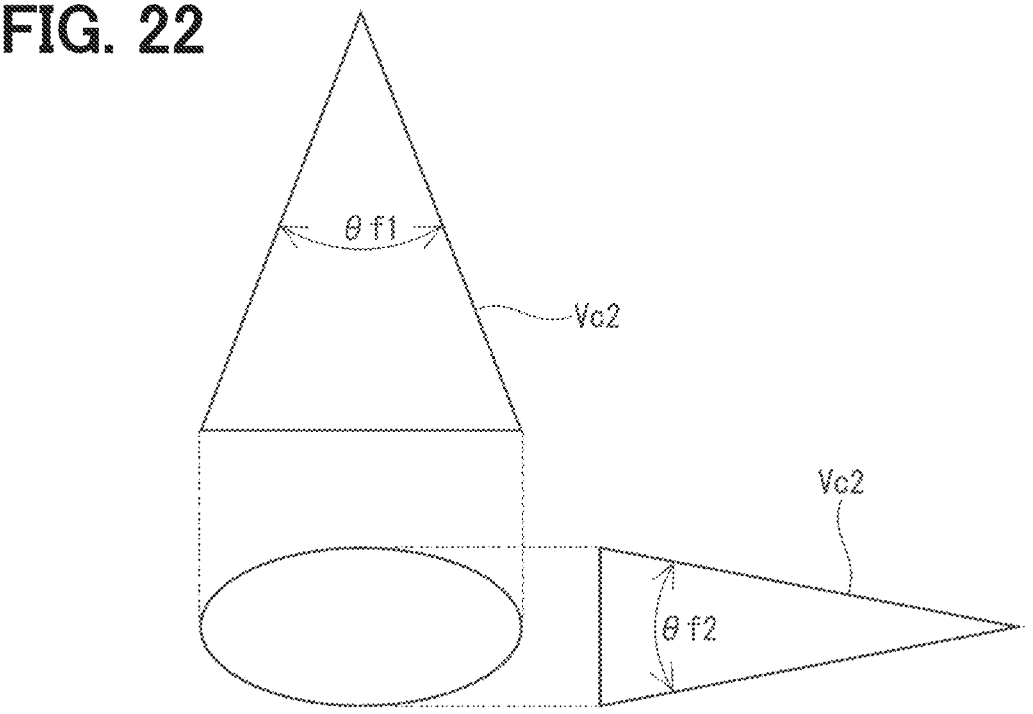
FIG. 22 is a diagram showing an imaginary non-perfect cone of the fuel injection valve according to the sixth embodiment.

When an imaginary cone, in which an angle that minimizes the angle formed by the two generatrices in the cross section formed by the third imaginary plane VP3 including the nozzle hole axis Axh1 of the non-perfect circular nozzle hole and intersecting with the second imaginary plane VP2 is set as "$\theta f2=\theta 2+0.5\times P$^0.6 Equation 4", is defined as an imaginary non-perfect cone Vc2 (see FIGS. 20, 21, and 22), at least two adjacent nozzle holes 13 among the six nozzle holes 13 are provided such that the imaginary perfect cone Vc1 or the imaginary non-perfect cone Vc2 does not interfere with the imaginary perfect cone Vc1 or the imaginary non-perfect cone Vc2.

"0.5×P^0.6" in the above Equation 4 is a difference between the "nozzle hole opening angle" (θ2) and the "fuel spray opening angle" (θf2=θ2+0.5×P^0.6), and corresponds to "the fuel spray opening angle increased by the fuel pressure in the fuel passage 100".

In the present embodiment, all nozzle holes 13 of the six nozzle holes 13 are provided such that the imaginary perfect cone Vc1 or the imaginary non-perfect cone Vc2 does not interfere with the imaginary perfect cone Vc1 or the imaginary non-perfect cone Vc2.

Figure 23:
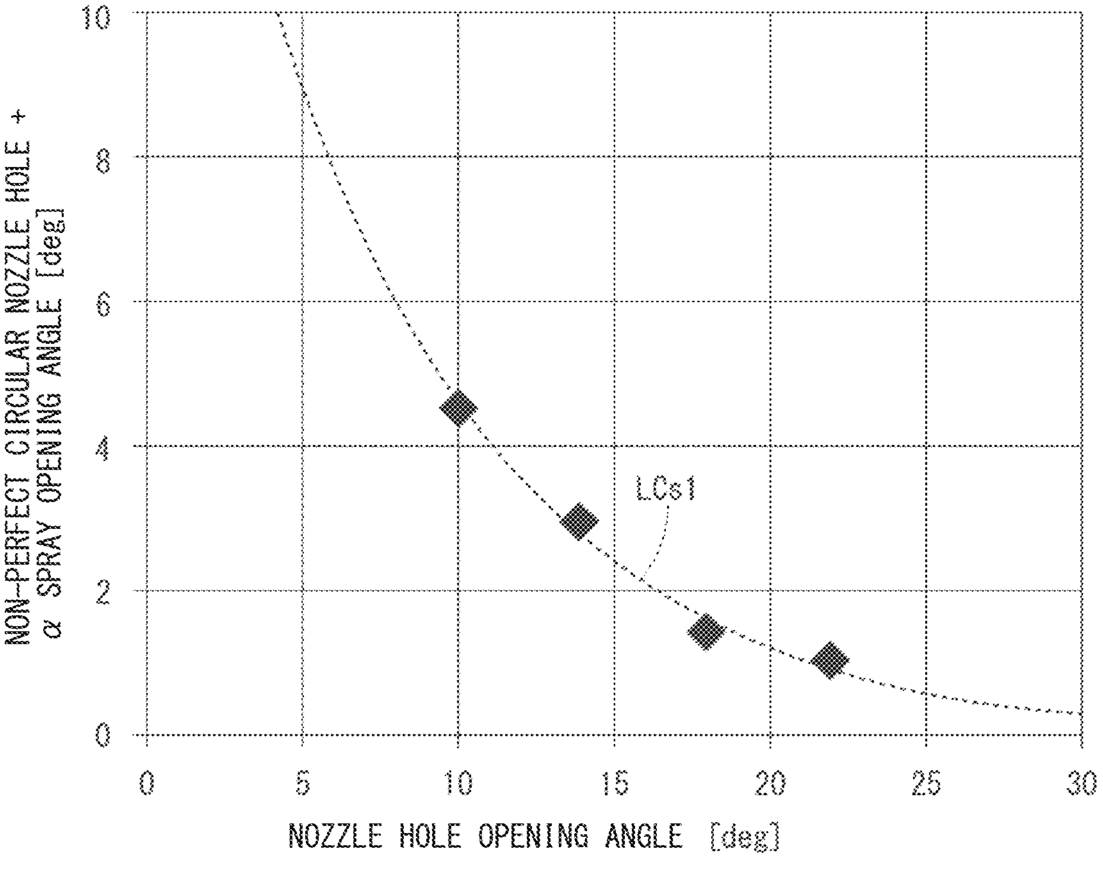
FIG. 23 is a diagram showing a relationship between a “nozzle hole opening angle” of the non-perfect circular nozzle hole and a “fuel spray opening angle increased due to a shape of the non-perfect circular nozzle hole” of the fuel injection valve according to the sixth embodiment.

FIG. 23 shows an experimental result showing a relationship between the "nozzle hole opening angle" (θ1) and the "fuel spray opening angle increased due to a shape of the non-perfect circular nozzle hole" (non-perfect circular nozzle hole+α spray opening angle) when the "nozzle hole opening angle" (θ1) is changed. As shown in FIG. 23, the larger the "nozzle hole opening angle" (θ1), the smaller the "fuel spray opening angle increased due to a shape of the non-perfect circular nozzle hole". An approximate curve LCs1 of the relationship between the "nozzle hole opening angle" (θ1) and the "fuel spray opening angle increased due to a shape of the non-perfect circular nozzle hole" (non-perfect circular nozzle hole+α spray opening angle) corresponds to "17×e^(−0.13×01)" in the above Equation 3.

Next, a method for defining the nozzle hole axis Axh1 of the "elliptical nozzle hole" will be described.

<Procedure 1>

Figure 24:
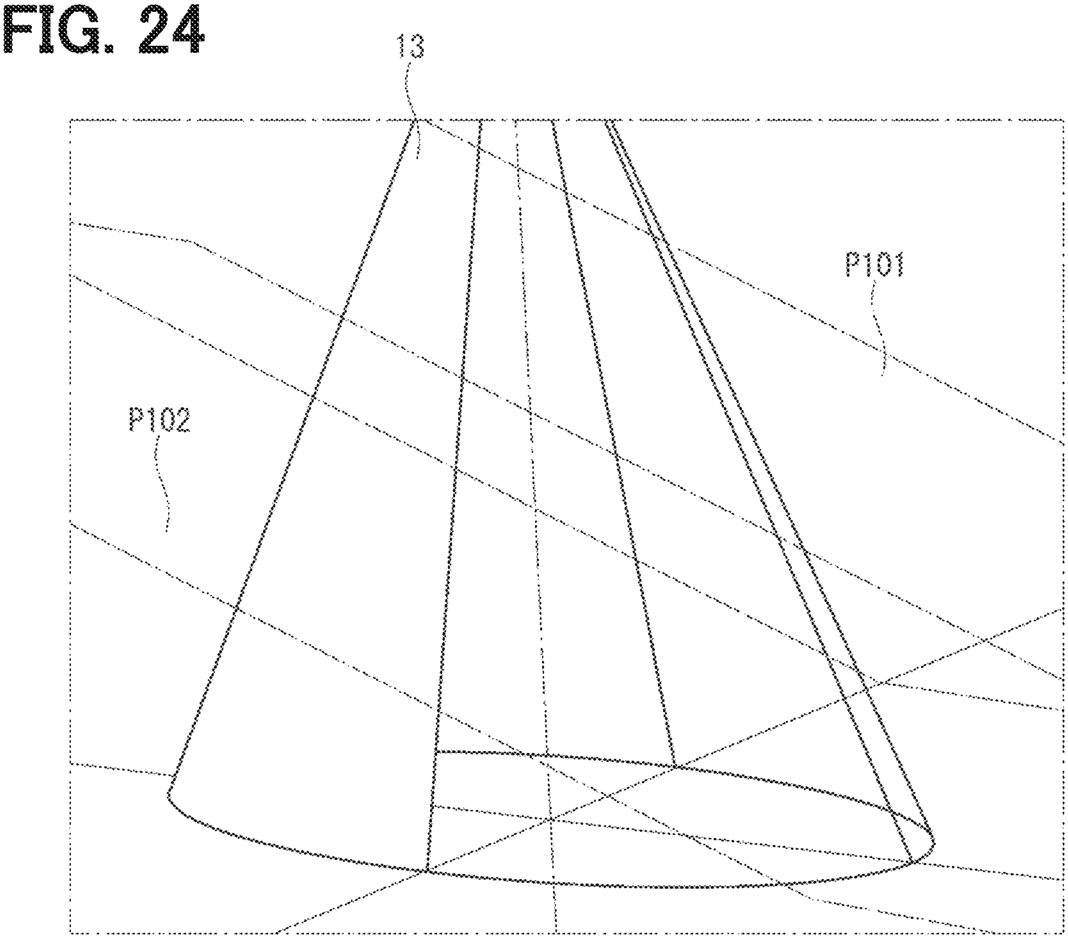
FIG. 24 is a diagram showing a method for defining a nozzle hole axis of the non-perfect circular nozzle hole of the fuel injection valve according to the sixth embodiment.
Figure 25:
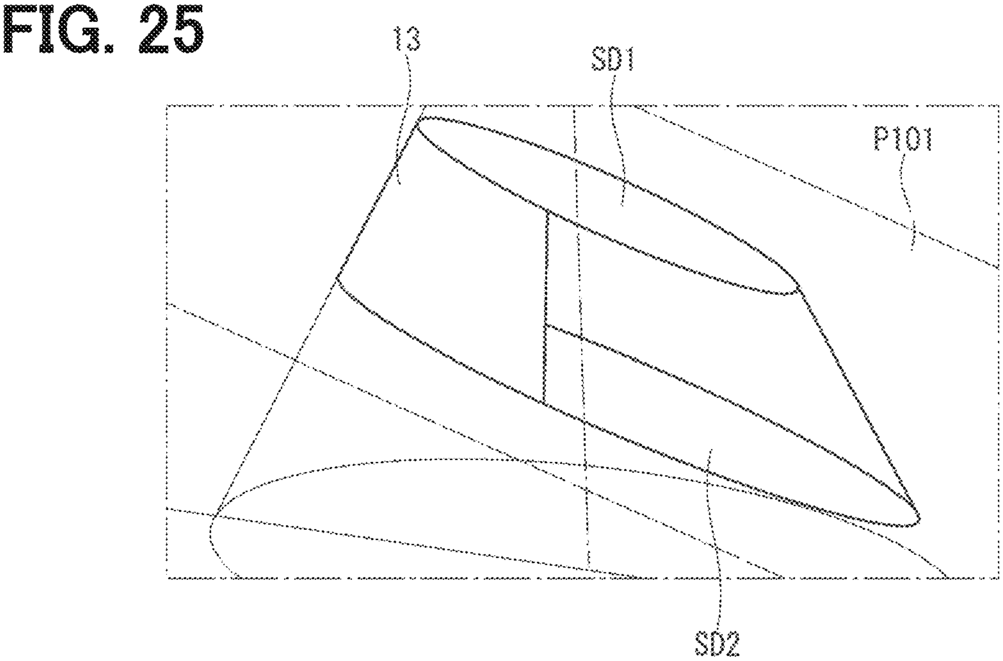
FIG. 25 is a diagram showing the method for defining the nozzle hole axis of the non-perfect circular nozzle hole of the fuel injection valve according to the sixth embodiment.

As shown in FIGS. 24 and 25, the nozzle hole 13 is cut at two suitable parallel planes P101 and P102.

<Procedure 2>

Figure 26:
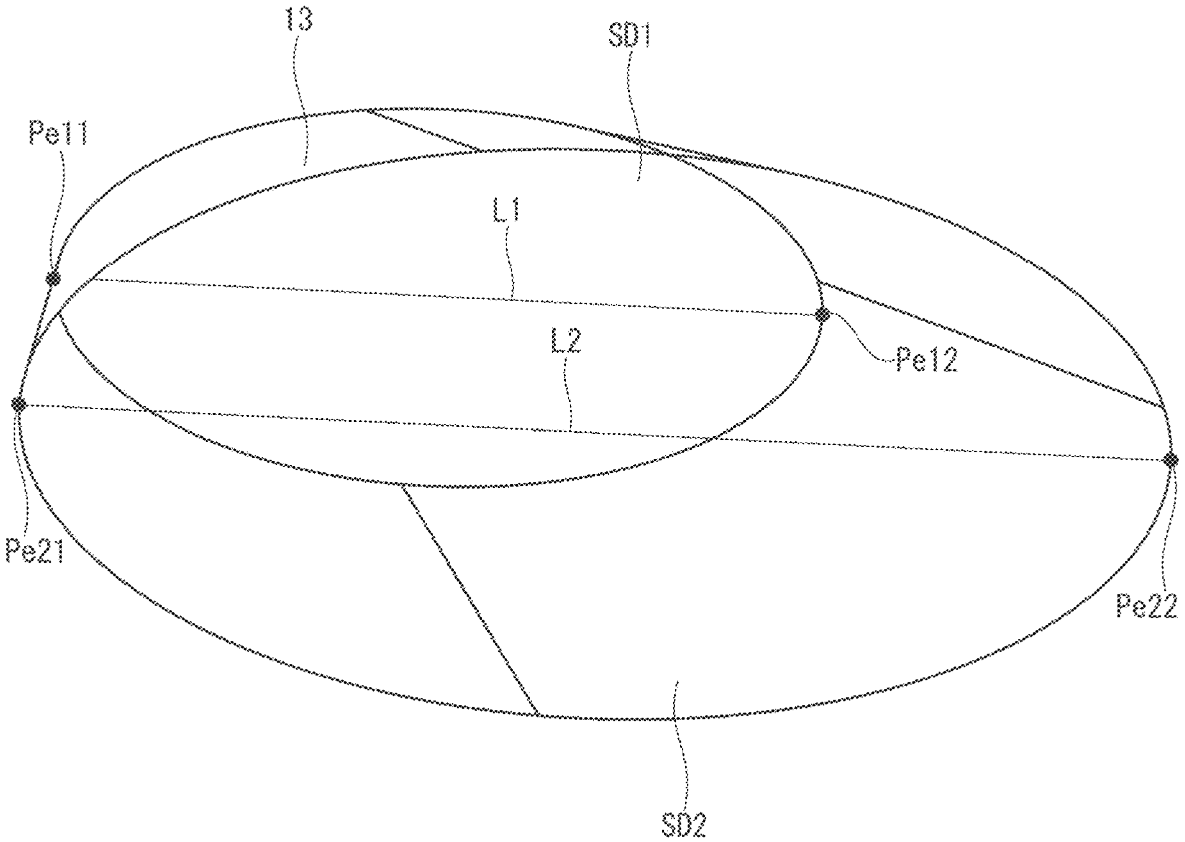
FIG. 26 is a diagram showing the method for defining the nozzle hole axis of the non-perfect circular nozzle hole of the fuel injection valve according to the sixth embodiment.

As shown in FIG. 26, intersection points of straight lines L1 and L2, which pass through parts where widths of cross sections SD1 and SD2 of the nozzle hole 13 cut in procedure 1 are the longest, and outer edge ends of the cross sections SD1 and SD2 are Pe11, Pe12, Pe21, and Pe22.

<Procedure 3>

Figure 27:
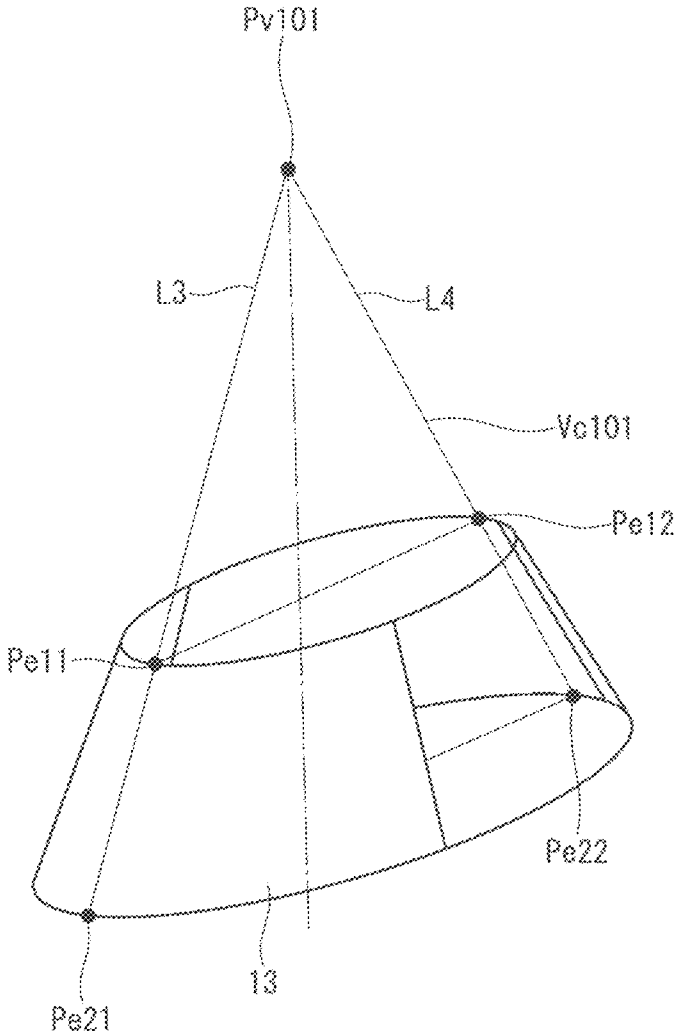
FIG. 27 is a diagram showing the method for defining the nozzle hole axis of the non-perfect circular nozzle hole of the fuel injection valve according to the sixth embodiment.

As shown in FIG. 27, an intersection point between a straight line L3, which extends by connecting the intersection point Pe21 and the intersection point Pe11 set in procedure 2, and a straight line L4, which extends by connecting the intersection point Pe22 and the intersection point Pe12, is a vertex Pv101 of an imaginary cone Vc101.

<Procedure 4>

Figure 28:
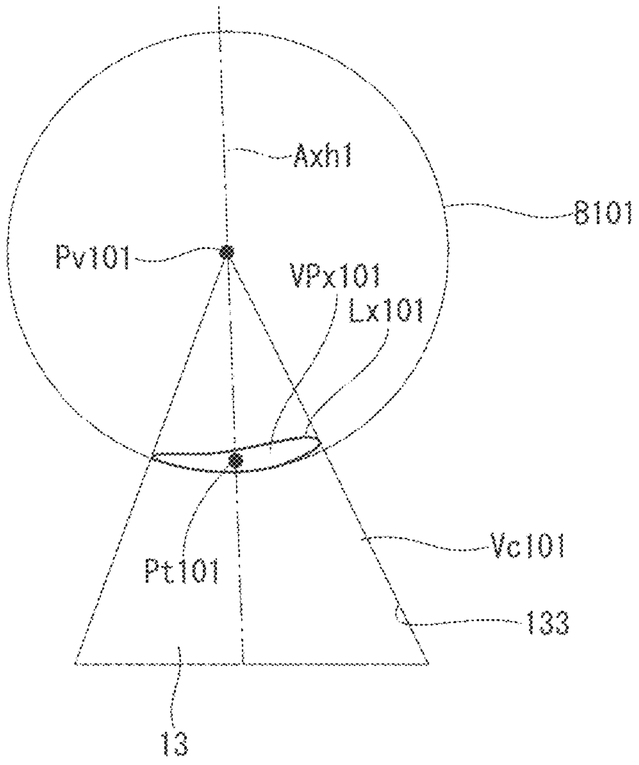
FIG. 28 is a diagram showing the method for defining the nozzle hole axis of the non-perfect circular nozzle hole of the fuel injection valve according to the sixth embodiment.
Figure 29:
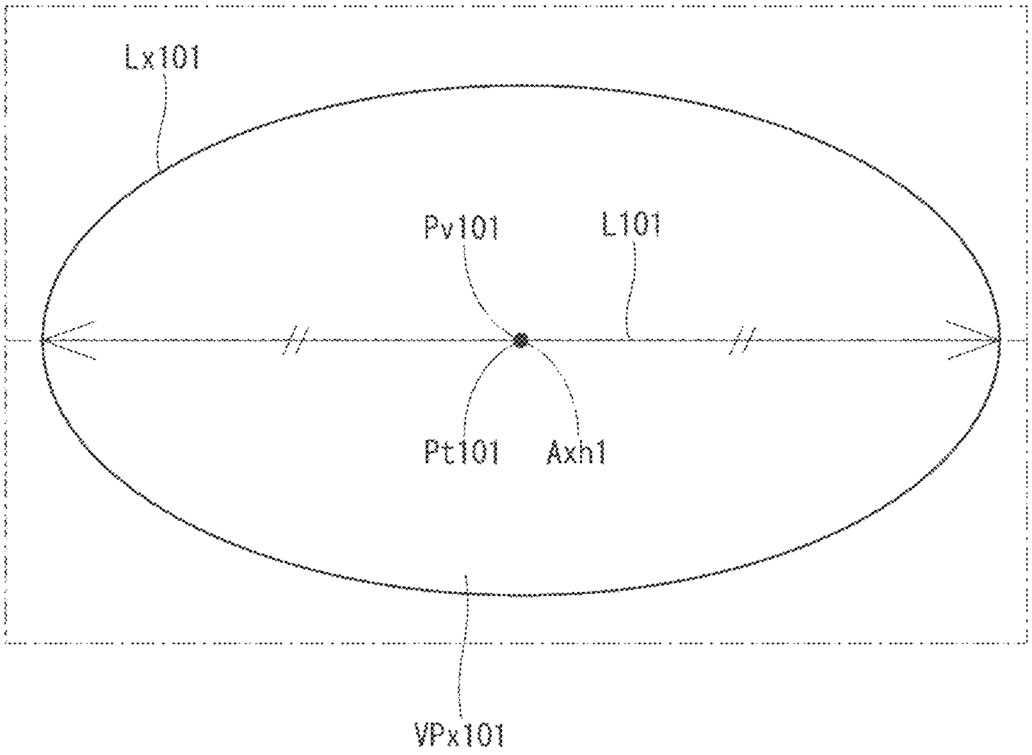
FIG. 29 is a diagram showing the method for defining the nozzle hole axis of the non-perfect circular nozzle hole of the fuel injection valve according to the sixth embodiment.

As shown in FIG. 28, a sphere B101 centered on the vertex Pv101 set in procedure 3 is formed, and a surface formed on an inner side of an intersection line Lx101 between the sphere B101 and the imaginary cone Vc101 (nozzle hole inner wall 133) is set as an imaginary plane VPx101. In the inner side of the imaginary plane VPx101, a straight line connecting a point Pt101 (see FIG. 29), which divides a straight line L101 passing through a part where a width of the imaginary plane VPx101 is the longest, and the vertex Pv101 is set as the nozzle hole axis Axh1.

Figure 30:
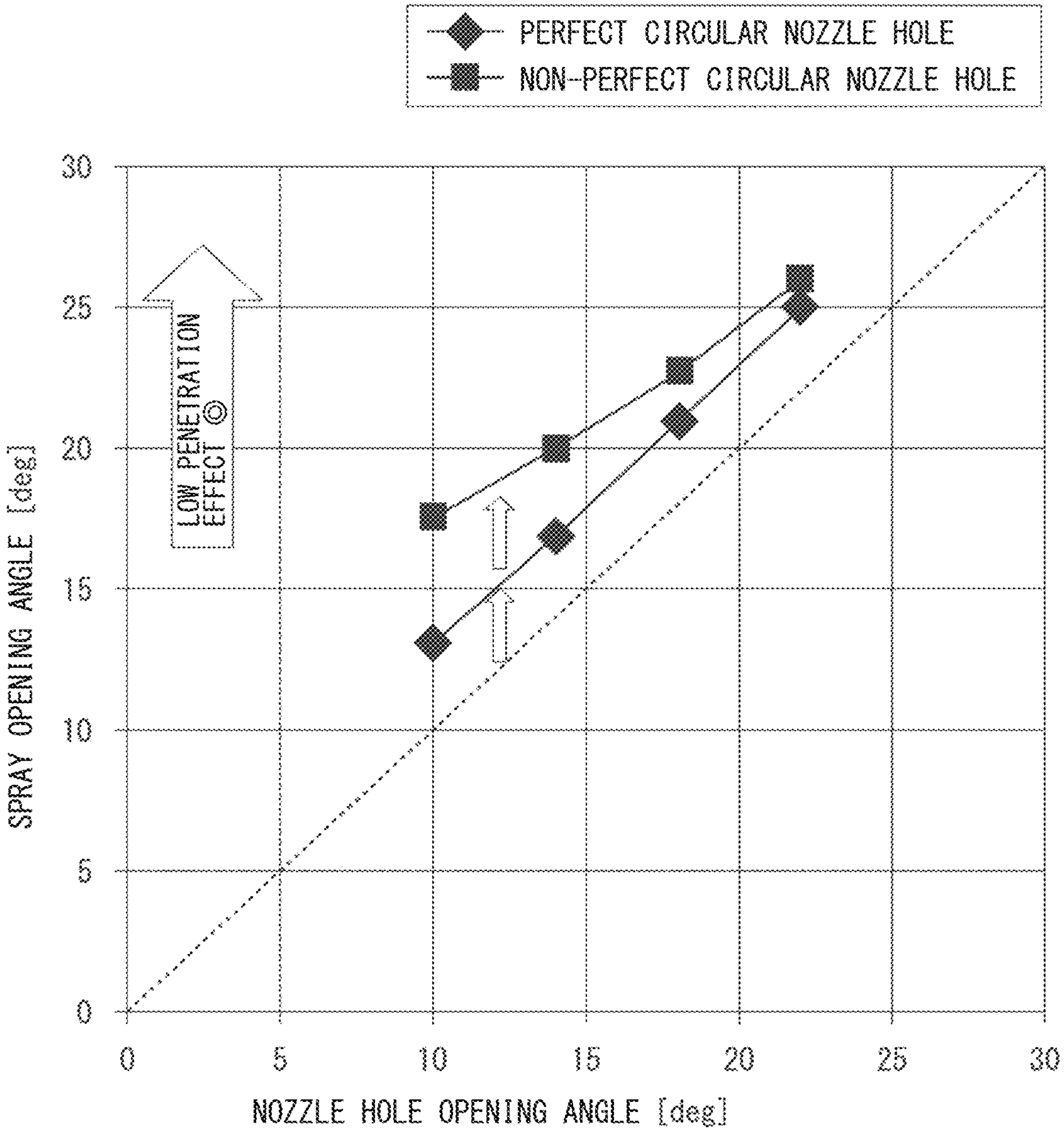
FIG. 30 is a diagram showing a relationship between the "nozzle hole opening angle" and a "spray opening angle" of the fuel injection valve according to the sixth embodiment.

As shown in FIG. 30, the opening angle of the fuel spray injected from the perfect circular nozzle hole (spray opening angle) is a sum of the "nozzle hole opening angle" and "0.5×P^0.6" corresponding to the "fuel spray opening angle increased by the fuel pressure in the fuel passage 100". On a side of the major diameter, the opening angle of the fuel spray injected from the non-perfect circular nozzle hole (spray opening angle) is a sum of the "nozzle hole opening angle" and "0.5×P^0.6", further, a sum of the "nozzle hole opening angle" and "17×e^(−0.13×θ1)" corresponding to the "fuel spray opening angle increased due to a shape of the non-perfect circular nozzle hole".

As shown in FIG. 30, the opening angle of the fuel spray injected from the non-perfect circular nozzle hole is larger than the opening angle of the fuel spray injected from the perfect circular nozzle hole as compared with the side of the major diameter.

Due to widening of a spray angle of the non-perfect circular nozzle hole, a length of the fuel spray injected from the non-perfect circular nozzle hole is shorter than the length of the fuel spray injected from the perfect circular nozzle hole, Therefore, it can be said that the non-perfect circular nozzle hole has a higher effect of reducing penetration of the fuel spray than that of the perfect circular nozzle hole.

In the present embodiment, the nozzle holes 61, 62, 64, and 66 as perfect circular nozzle holes and the nozzle holes 63 and 65 as non-perfect circular nozzle holes are disposed as shown in FIG. 14. All the nozzle holes 13 (nozzle holes 61 to 66) are provided such that the imaginary non-perfect cone Vc2 and the imaginary perfect cone Vol or the imaginary non-perfect cone Vc2 do not interfere with each other. Therefore, a closed space is not formed between the fuel spray, no negative pressure is generated, and air can be introduced. Accordingly, the fuel spray can be restricted from contracting and coalescing, Therefore, wetting in a cylinder and deterioration of spray characteristics due to high penetration of the spray can be restricted. Therefore, by including at least one non-perfect circular nozzle hole, accumulation of a deposit on the nozzle hole inner wall 133 is restricted, and the penetration of the fuel spray is reduced, and by forming the nozzle holes 13 such that the fuel spray injected from the nozzle holes 13 does not interfere with each other and setting a nozzle hole opening angle appropriately, the wetting in the cylinder and the deterioration of the spray characteristics due to the high penetration of the spray can be restricted.

In the present embodiment, it is possible to realize low penetration of the fuel spray Fo injected from the nozzle holes 63 and 65, that is, the "elliptical nozzle holes", which are close to an inner wall of the cylinder in side mounting. Therefore, the wetting of the inner wall of the cylinder can be effectively restricted.

Figure 31:
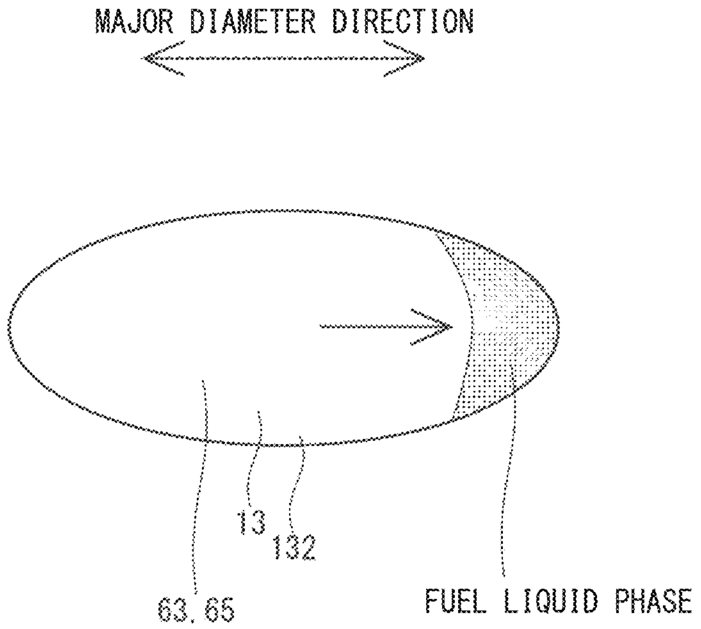
FIG. 31 is a diagram showing a non-perfect circular nozzle hole at the end of the fuel injection of the fuel injection valve according to the sixth embodiment.
Figure 32:
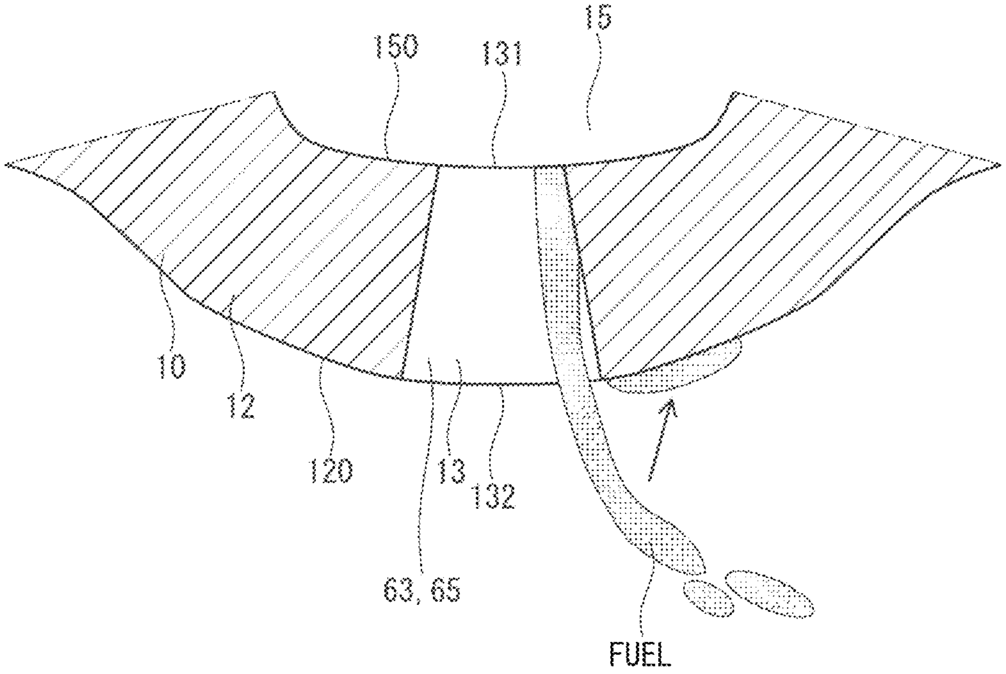
FIG. 32 is a cross-sectional view showing the non-perfect circular nozzle hole at the end of the fuel injection of the fuel injection valve according to the sixth embodiment.

As shown in FIG. 19, in the non-perfect circular nozzle hole, during fuel injection, by extending the fuel in the major diameter direction (the side of the major axis) and ejecting the fuel in a form of a liquid film, splitting can be promoted and the fuel spray can be atomized. On the other hand, in the oval nozzle hole, at the end of injection after the needle 30 is seated, since the fuel in the nozzle hole collects in a rounded part in the major diameter direction (the side of the major axis) and is ejected in a form of a liquid thread, fuel sharpness may deteriorate, and wetting around a nozzle hole on an outer wall of the nozzle 10 may increase (see FIGS. 31 and 32).

Further, as shown in FIG. 14, the flatness a1/b1 (>1) of the outlet opening portion 132 of the nozzle hole 63 as a non-perfect circular nozzle hole is larger than the flatness a2/b2 (=1) of the outlet opening portion 132 of the nozzle hole 64 as a perfect circular nozzle hole. Further, an area of the inlet opening portion 131 of the non-perfect circular nozzle hole (63 and 65) having large flatness of the outlet opening portion 132 is smaller than an area of the inlet opening portion 131 of the perfect circular nozzle holes (61, 62, 64, and 66) having small flatness of the outlet opening portion 132.

In the present embodiment, at the end of fuel injection from the nozzle hole 13 after the needle 30 is seated, air flows into the suction chamber 15 from the non-perfect circular nozzle holes (63 and 65) where the fuel is difficult to flow since the area of the inlet opening portion 131 is small and which have large flatness of the outlet opening portion 132, and the fuel is completely injected from the perfect circular nozzle holes (61, 62, 64, and 66) where the fuel easily flows since the area of the inlet opening portion 131 is large and which have small flatness of the outlet opening portion 132, and the injection ends. Therefore, it is possible to reduce an amount of a low-pressure fuel injected from the nozzle hole 13 having large flatness, which is easy to get wet with fuel, and to restrict the fuel wetting. Therefore, it is possible to restrict tip wet to the same level as in the related art while achieving both a wide angle of the fuel spray and a minimization of an influence of spray change.

As described above, in the present embodiment, by setting one or more nozzle holes 13 among the multiple nozzle holes 13 as non-perfect circular nozzle holes in which a ratio of the longest diameter to the shortest diameter of the outlet opening portion 132 is larger than 1, the accumulation of the deposit on the nozzle hole inner wall 133 can be restricted.

The imaginary non-perfect cone Vc2 and the imaginary perfect cone Vc1 are defined for the non-perfect circular nozzle hole and the perfect circular nozzle hole, respectively, and by forming at least two adjacent nozzle holes 13 such that the imaginary non-perfect cone Vc2 and the imaginary perfect cone Vol or the imaginary non-perfect cone Vc2 do not interfere with each other, interference between fuel spray injected from the nozzle holes 13 can be restricted. Therefore, a closed space is not formed between the fuel spray, no negative pressure is generated, and air can be introduced. Accordingly, the fuel spray can be restricted from contracting and coalescing. Therefore, wetting in a cylinder and deterioration of spray characteristics due to high penetration of the spray can be restricted.

In the present embodiment, the nozzle holes 63 and 65 as the non-perfect circular nozzle holes are provided such that the minor diameter direction of the outlet opening portion 132 is along the injection direction of the fuel injected from the non-perfect circular nozzle holes. Therefore, the liquid film can be thin and atomized by placing the fuel along the nozzle hole inner wall 133 in a major axis direction.

In the present embodiment, the one or more non-perfect circular nozzle holes (63 and 65) have an elliptical shape in which the inlet opening portion 131 and the outlet opening portion 132 have the same flatness. Therefore, when the nozzle hole 13 is laser-machined, the scanning by a laser can be performed with a focal point being fixed, and a non-perfect circular nozzle hole can be easily formed.

The sixth embodiment has the same configuration as the first embodiment except for the above points.

In the present embodiment, as in the first embodiment, when the needle 30 is most separated from the valve seat 14, a minimum value of a flow channel area between the valve seat 14 and the needle 30 is set as a seat throttle area As, a minimum value of a flow channel area of the nozzle hole 13 is set as a nozzle hole throttle area Ah, and As>Ah. The nozzle hole 13 is provided such that the normal line Ln1 of the suction wall surface 150 at the opening intersection point Po1, which is the intersection point between the nozzle hole axis Axh1 and the inlet opening portion 131, intersects the nozzle hole inner wall 133 or the imaginary inner wall VW1 extending the nozzle hole inner wall 133 to the side opposite from the nozzle cylinder portion 11 (see FIG. 15). Therefore, in addition to the above effects, the same effects as those in the first embodiment can be obtained.

Seventh Embodiment

Figure 33:
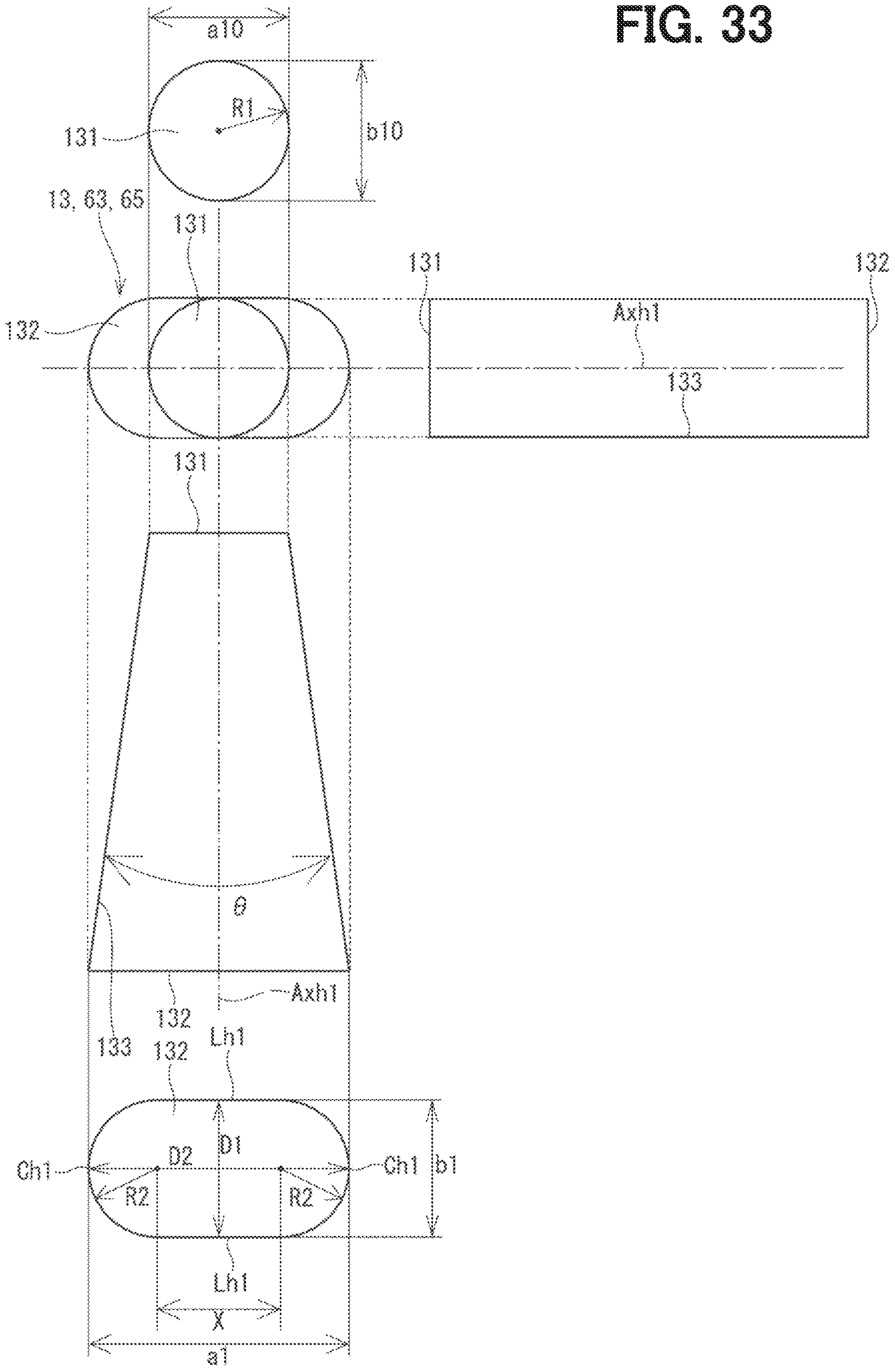
FIG. 33 is a schematic view showing a non-perfect circular nozzle hole of a fuel injection valve according to a seventh embodiment.

A part of a fuel injection valve according to a seventh embodiment is shown in FIG. 33. In the seventh embodiment, a configuration of a non-perfect circular nozzle hole is different from that in the sixth embodiment.

As shown in FIG. 33, in the present embodiment, in the nozzle holes 63 and 65 as the non-perfect circular nozzle holes, the inlet opening portion 131 has a perfect circular shape with a radius R1, and the outlet opening portion 132 has a shape in which two semicircles Ch1 having the same curvature as the shape of the inlet opening portion 131 are connected by a straight line Lh1. Therefore, when viewed from the direction of the nozzle hole axis Axh1, the shape of the outlet opening portions 132 of the nozzle holes 63 and 65 is a track shape, that is, a non-perfect circular shape (see FIG. 33). The nozzle holes 63 and 65 are referred to as “non-perfect circular nozzle holes”, The nozzle holes 63 and 65 are appropriately referred to as “track nozzle holes”. A radius R2 of the semicircle Ch1 is the same as the radius R1 of the inlet opening portion 131.

In the nozzle holes 63 and 65 as non-perfect circular nozzle holes, a ratio of the longest diameter a10 to the shortest diameter b10 of the inlet opening portion 131 is 1 and flatness a10/b10 is 1 (see FIG. 33).

In the nozzle holes 63 and 65 as non-perfect circular nozzle holes, a ratio of the longest diameter a1 to the shortest diameter b1 of the outlet opening portion 132 is larger than 1 and flatness alibi is larger than 1 (see FIG. 33). In the present embodiment, the shortest diameter b10 of the inlet opening portion 131 and the shortest diameter b1 of the outlet opening portion 132 are the same. A distance X between centers of the two semicircles Ch1 forming the outlet opening portion 132 is determined by nozzle hole opening angles of the nozzle holes 63 and 65.

Figure 34:
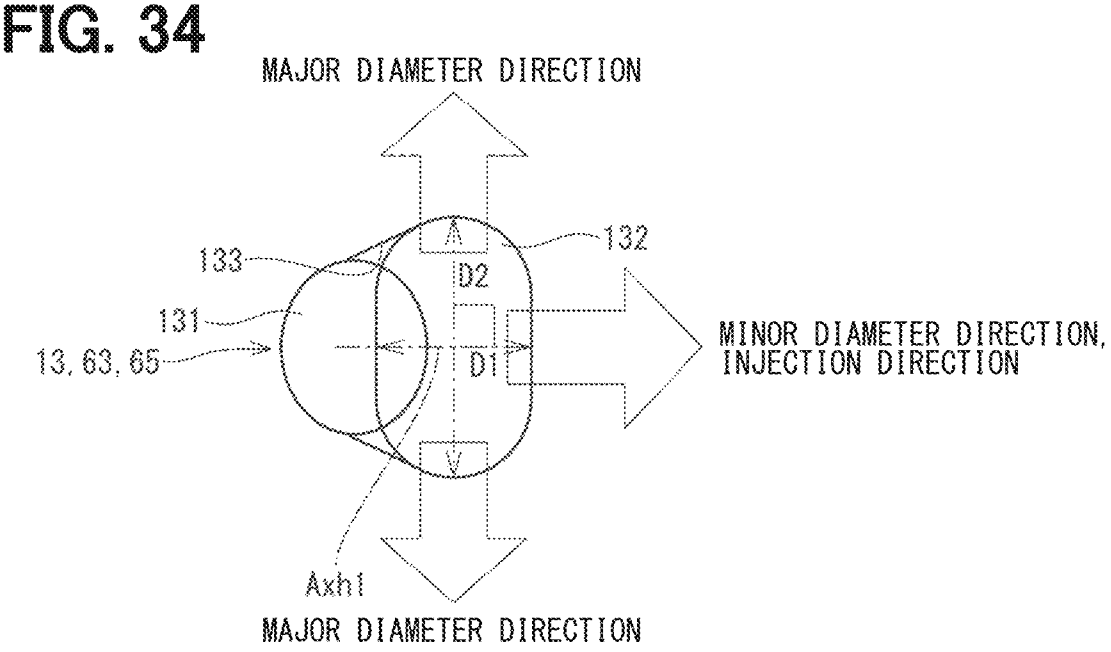
FIG. 34 is a schematic view showing the non-perfect circular nozzle hole of the fuel injection valve according to the seventh embodiment.

As shown in FIG. 34, the nozzle holes 63 and 65 as the non-perfect circular nozzle holes are provided such that a minor diameter direction of the outlet opening portion 132 is along an injection direction of a fuel injected from the non-perfect circular nozzle holes. The “minor diameter direction” corresponds to a direction along a direction D1 of the minor diameter of the outlet opening portion 132, that is, the smallest width among the widths of the outlet opening portion 132 when viewed from a direction of the axis Ax1 of the nozzle cylinder portion 11. The “injection direction of a fuel” corresponds to a direction along the nozzle hole axis Axh1 when viewed from the direction of the axis Ax1 of the nozzle cylinder portion 11. In FIG. 34, the “major diameter direction” corresponds to a direction along a direction D2 of the major diameter of the outlet opening portion 132, that is, the largest width among the widths of the outlet opening portion 132.

In the present embodiment, with respect to the nozzle holes 63 and 65 as the non-perfect circular nozzle holes, when the imaginary non-perfect cone Vc2 is defined as the non-perfect circular nozzle hole in the first embodiment, all nozzle holes 13 of the six nozzle holes 13 are provided such that the imaginary perfect cone Vc1 or the imaginary non-perfect cone Vc2 does not interfere with the imaginary perfect cone Vc1 or the imaginary non-perfect cone Vc2.

Next, a method for defining the nozzle hole axis Axh1 of the "non-perfect circular nozzle hole", that is, the "track nozzle hole" will be described.

<Procedure 1>

Figure 35:
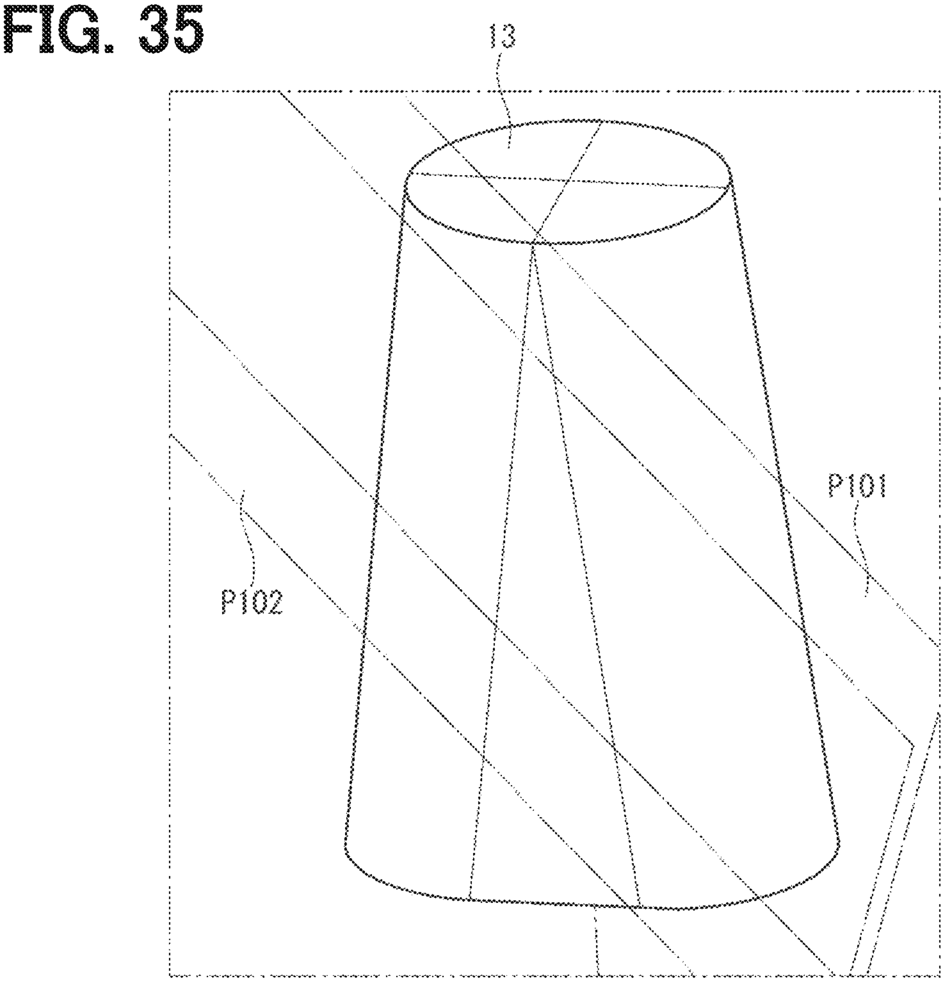
FIG. 35 is a diagram showing a method for defining a nozzle hole axis of the non-perfect circular nozzle hole of the fuel injection valve according to the seventh embodiment.

As shown in FIG. 35, the nozzle hole 13 is cut at the two suitable parallel planes P101 and P102.

<Procedure 2>

Figure 36:
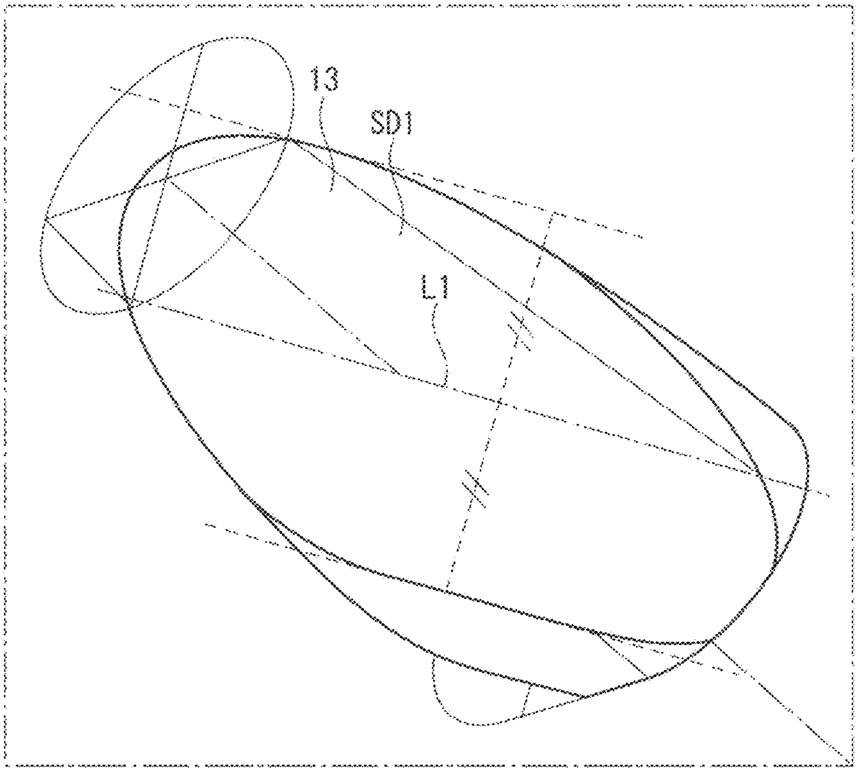
FIG. 36 is a diagram showing the method for defining the nozzle hole axis of the non-perfect circular nozzle hole of the fuel injection valve according to the seventh embodiment.
Figure 37:
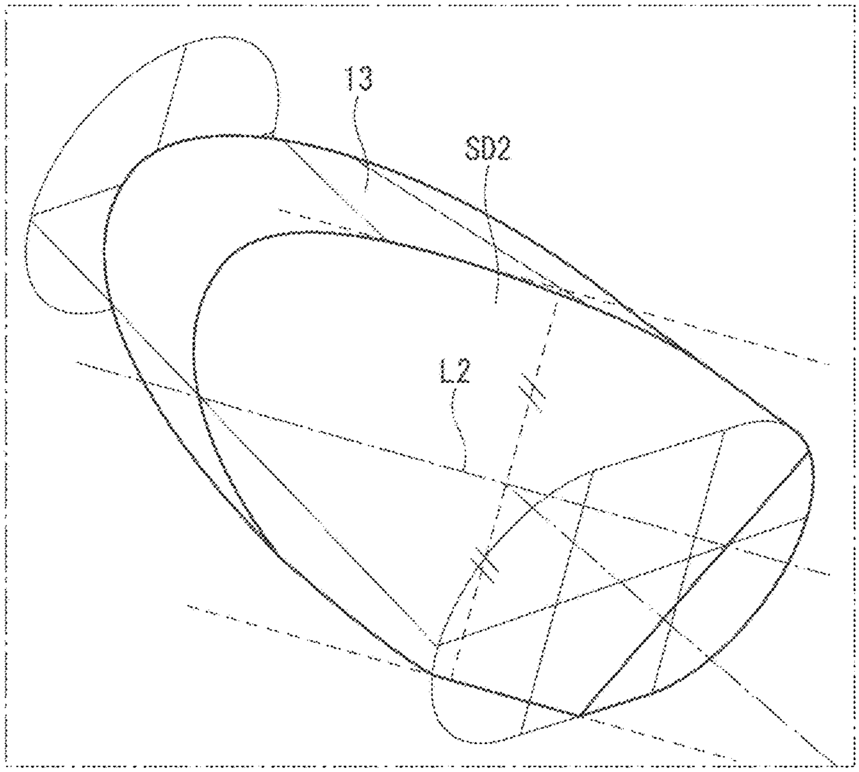
FIG. 37 is a diagram showing the method for defining the nozzle hole axis of the non-perfect circular nozzle hole of the fuel injection valve according to the seventh embodiment.

As shown in FIGS. 36 and 37, in each of the cross sections SD1 and SD2 of the nozzle hole 13 cut in the procedure 1, the straight lines L1 and L2 that are parallel to and equidistant to two straight line portions at outer edge ends of the cross sections SD1 and SD2 are set.

<Procedure 3>

Figure 38:
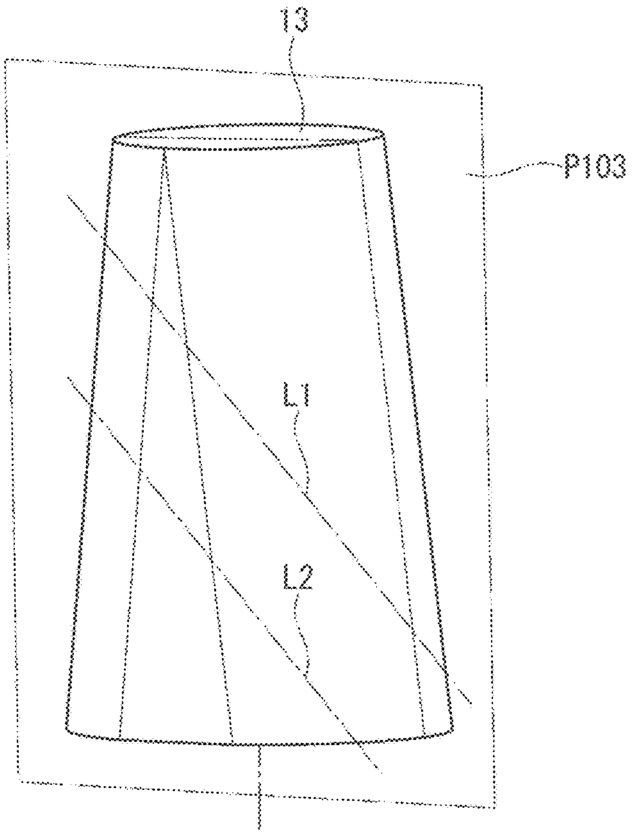
FIG. 38 is a diagram showing the method for defining the nozzle hole axis of the non-perfect circular nozzle hole of the fuel injection valve according to the seventh embodiment.
Figure 39:
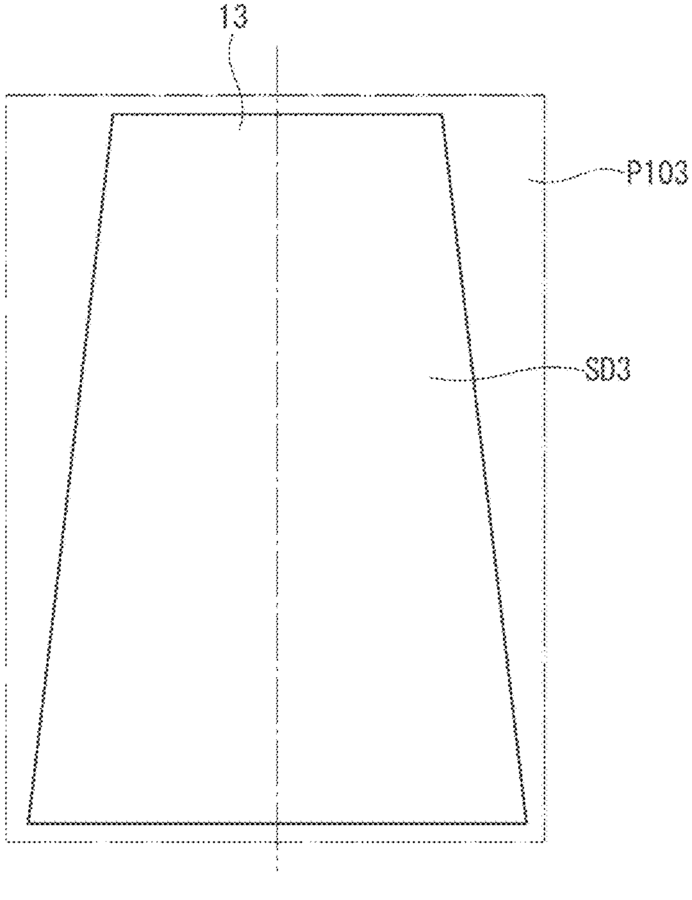
FIG. 39 is a diagram showing the method for defining the nozzle hole axis of the non-perfect circular nozzle hole of the fuel injection valve according to the seventh embodiment.

As shown in FIGS. 38 and 39, the nozzle hole 13 is cut at a plane P103 including the straight lines L1 and L2 set in the procedure 2.

<Procedure 4>

Figure 40:
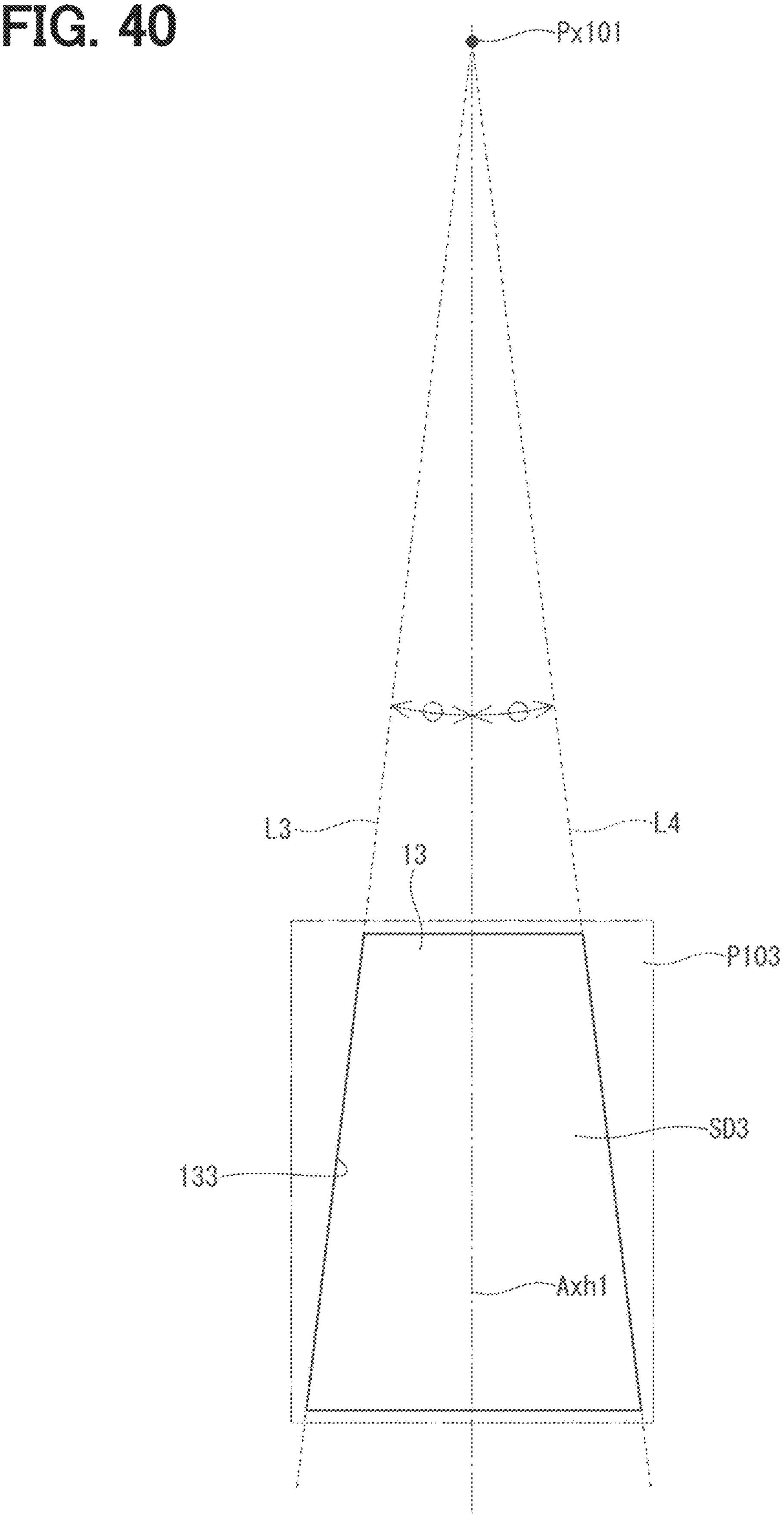
FIG. 40 is a diagram showing the method for defining the nozzle hole axis of the non-perfect circular nozzle hole of the fuel injection valve according to the seventh embodiment.

As shown in FIG. 40, a straight line passing through an intersection point Px101 of the straight lines L3 and L4 extending through a part of an outer edge end of a cross section SD3 of the nozzle hole 13 cut in the procedure 3 corresponding to the nozzle hole inner wall 133, and a position equidistant from the straight lines L3 and L4 is the nozzle hole axis Axh1.

Figure 41:
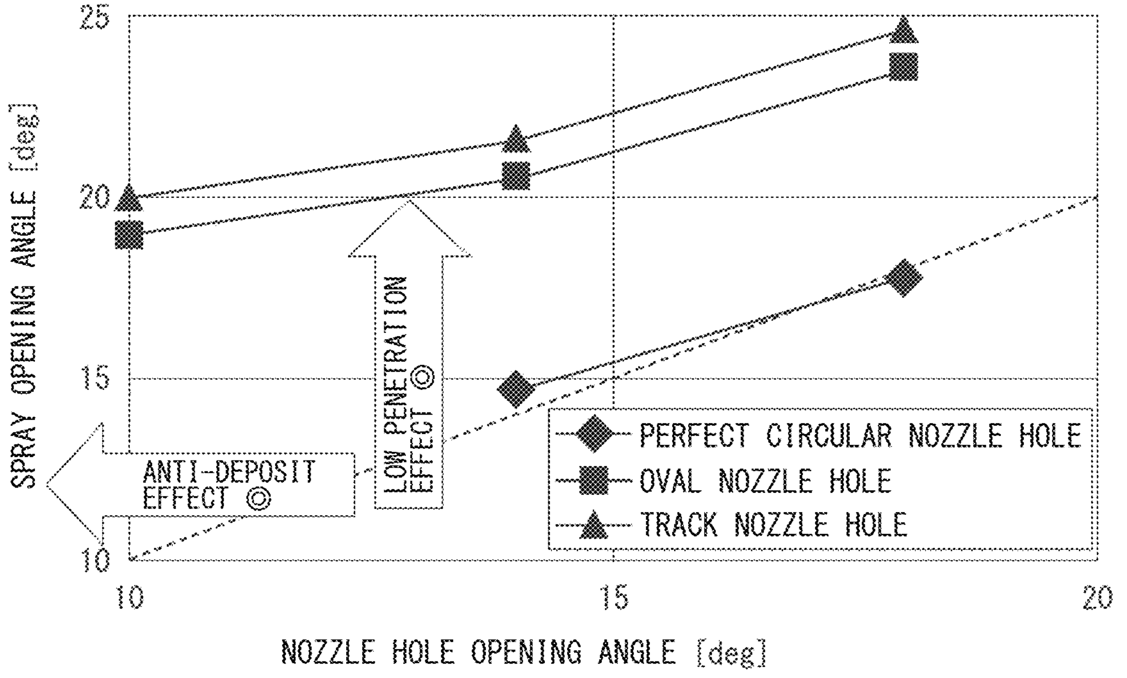
FIG. 41 is a diagram showing a relationship between an "nozzle hole opening angle" and a "spray opening angle" of the fuel injection valve according to the seventh embodiment.

As shown in FIG. 41, an opening angle of fuel spray injected from the truck nozzle hole (spray opening angle) is larger than an opening angle of fuel spray injected from the elliptical nozzle hole. Therefore, it can be seen that the truck nozzle hole is more effective in reducing penetration of the fuel spray than the elliptical nozzle hole.

As described above, in the present embodiment, in the one or more non-perfect circular nozzle holes (63 and 65), the inlet opening portion 131 has a perfect circular shape, and the outlet opening portion 132 has a shape in which the two semicircles Ch1 having the same curvature as the shape of the inlet opening portion 131 are connected by the straight line Lh1. Therefore, a radius of a curvature of the rounded part at the outer edge end of the outlet opening portion 132 can be increased as compared with that of the elliptical nozzle hole, and the fuel can easily escape from the rounded part. Accordingly, wetting of a tip end of the nozzle 10 can be restricted.

The seventh embodiment has the same configuration as the sixth embodiment except for the above points.

Eighth Embodiment

Figure 42:
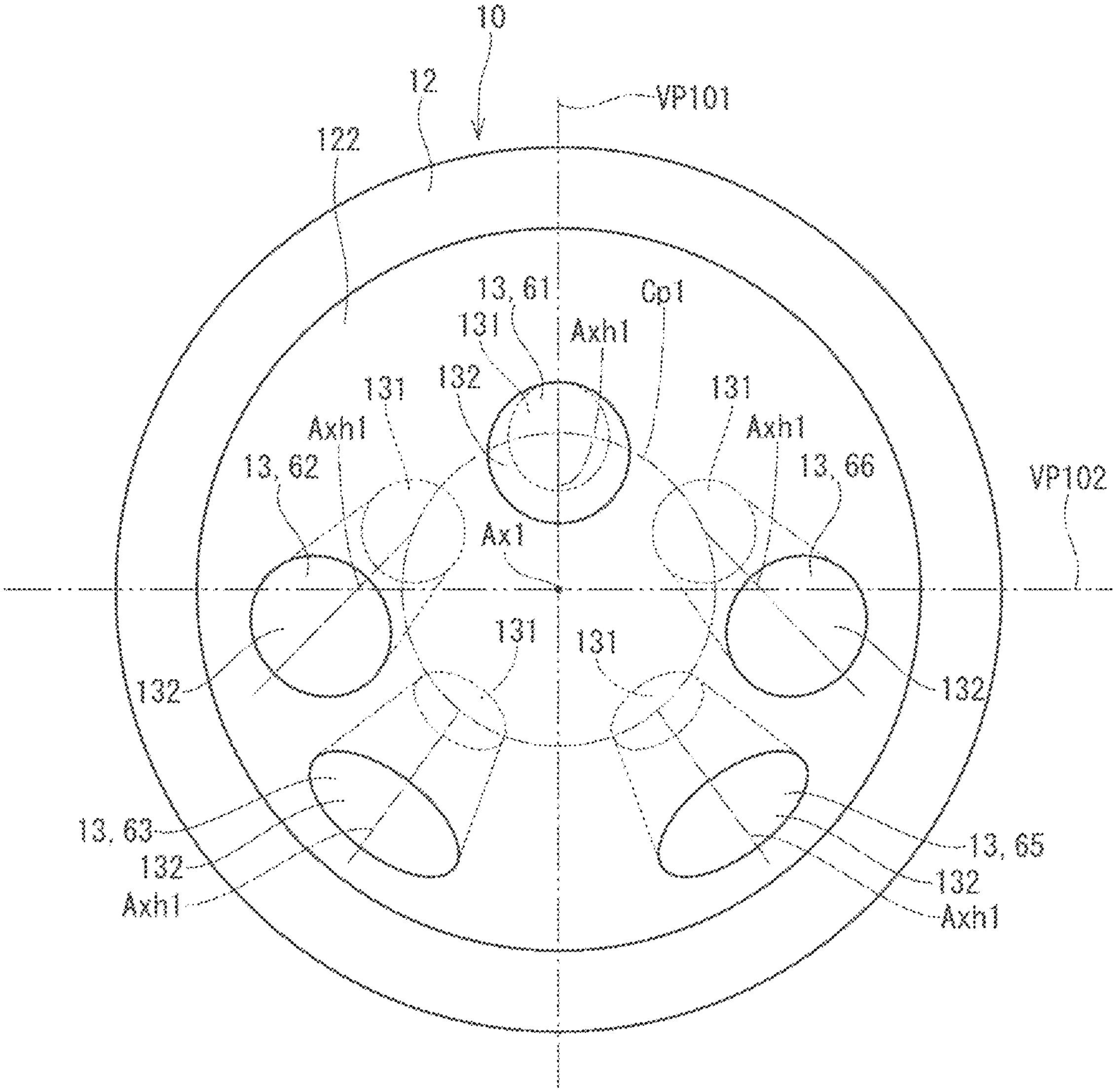
FIG. 42 is a diagram showing a nozzle bottom portion and a nozzle hole of a fuel injection valve according to an eighth embodiment.

A fuel injection valve according to an eighth embodiment will be described with reference to FIG. 42. In the eighth embodiment, the configuration of the nozzle hole 13 is different from that in the sixth embodiment.

In the present embodiment, the nozzle 10 does not have the nozzle hole 64 shown in the first embodiment. That is, in the present embodiment, five nozzle holes 13 are provided in the nozzle 10. The centers of the inlet opening portions 131 of the nozzle holes 61, 62, 63, 65, and 66 are disposed at equal intervals on the pitch circle Cp1 centered on the axis Ax1.

Ninth Embodiment

Figure 43:
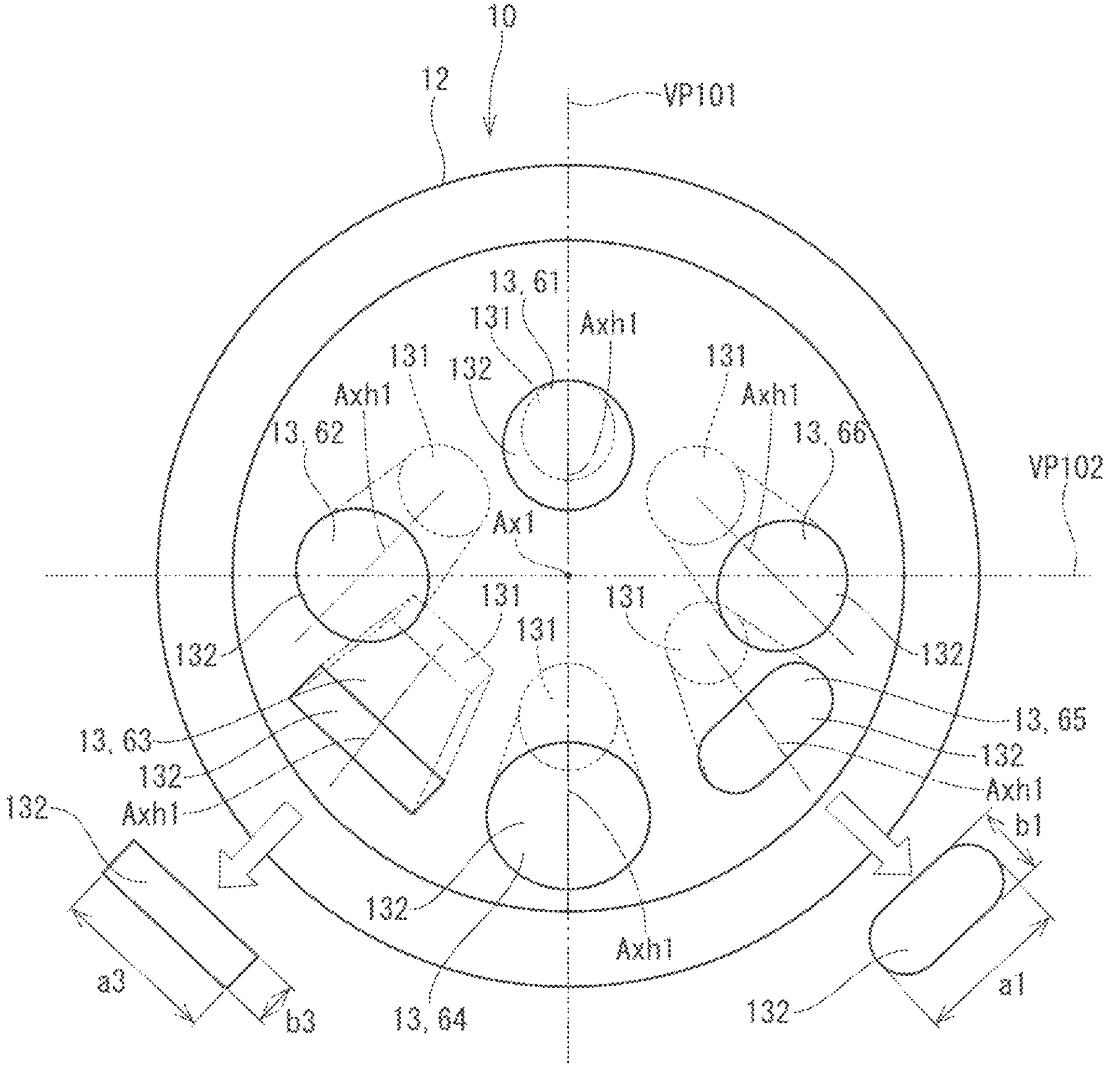
FIG. 43 is a diagram showing a nozzle hole of a fuel injection valve according to a ninth embodiment and a vicinity thereof.

A part of a fuel injection valve according to a ninth embodiment is shown in FIG. 43. In the ninth embodiment, the configuration of the nozzle hole 13 as a non-perfect circular nozzle hole is different from that in the sixth embodiment. In the present embodiment, the nozzle hole 63 as a non-perfect circular nozzle hole is provided such that both the inlet opening portion 131 and the outlet opening portion 132 have a rectangular shape. In the nozzle hole 63, a ratio of a length of a long side a3 to a length of a short side b3 of the outlet opening portion 132 and flatness a3/b3 are larger than 1.

In the nozzle hole 65 as a non-perfect circular nozzle hole, the inlet opening portion 131 has a perfect circular shape and the outlet opening portion 132 has a track shape. In the nozzle hole 65, a ratio of a length of the major diameter a1 to a length of the minor diameter b1 of the outlet opening portion 132 and flatness a1/b1 are larger than 1, That is, the nozzle hole 65 has the same configuration as the nozzle hole 65 in the seventh embodiment.

The ninth embodiment has the same configuration as the sixth embodiment except for the above points.

Another Embodiment

In another embodiment, the nozzle hole 13 may be provided such that the normal line Ln1 intersects the imaginary inner wall VW1, which extends through the nozzle hole inner wall 133 to the side opposite from the nozzle cylinder portion 11, instead of the nozzle hole inner wall 133. In this case, it is desirable that the injection hole 13 is provided such that LA/LB>−0.2.

In the first embodiment, an example is shown in which the normal line Ln1 intersects the nozzle hole inner wall 133 on the side of the axis Ax1 of the nozzle cylinder portion 11 of the two nozzle hole inner walls 133 shown in the cross section along the imaginary plane Sc1 On the other hand, in the other embodiment, the normal line Ln1 may intersect the imaginary inner wall VW1 on the side of the axis Ax1 of the nozzle cylinder portion 11 of the two imaginary inner walls VW1 shown in the cross section along the imaginary plane Sc1.

In the second embodiment described above, an example is shown in which the normal line Ln1 intersects the nozzle hole inner wall 133 on the side opposite from the axis Ax1 of the nozzle cylinder portion 11 of the two nozzle hole inner walls 133 shown in the cross section along the imaginary plane Sc1. On the other hand, in the other embodiment, the normal line Ln1 may intersect the imaginary inner wall VW1 on the side opposite from the axis Ax1 of the nozzle cylinder portion 11 of the two imaginary inner walls VW1 shown in the cross section along the imaginary plane Sc1.

In the other embodiment, at least one of the multiple nozzle holes 13 may be a tapered nozzle hole provided in a tapered shape such that the nozzle hole inner wall 133 is distant from the nozzle hole axis Axh1 from the inlet opening portion 131 toward the outlet opening portion 132.

In the other embodiment, at least one of the at least one tapered nozzle hole may be provided such that the normal line Ln1 of the suction wall surface 150 at the opening intersection point Po1 intersects the nozzle hole inner wall 133 or the imaginary inner wall VW1.

In the sixth embodiment described above, an example is shown in which the average pressure P(MPa) of the fuel in the fuel passage when the fuel is injected from the nozzle hole is 20 (MPa). On the other hand, in the other embodiment, P may be lower than 20 or higher than 20 as long as the multiple nozzle holes are provided so as to satisfy a relationship of the above Equations 1 to 3. That is, the nozzle hole is capable of being appropriately provided according to the pressure of the fuel in the fuel passage assumed when the fuel injection valve is used.

In the other embodiment, the fuel injection valve may be mounted on the engine 80 in any posture.

In the other embodiment, the nozzle cylinder portion and the nozzle bottom portion of the nozzle may be provided separately. In the other embodiment, the first cylinder member 21 of the housing 20 and the nozzle or the nozzle cylinder portion may be integrally provided.

In the other embodiment, the first cylinder member 21 the second cylinder member 22, and the third cylinder member 23 of the housing 20 may be integrally provided. In this case, for example, the second cylinder member 22 may be provided thinly to form a magnetic throttle portion.

In the above-described embodiments, an example of applying a fuel injection valve to a direct-injection type gasoline engine is shown. On the other hand, in the other embodiment, the fuel injection valve may be applied to, for example, a diesel engine, a port injection type gasoline engine, and the like.

As described above, the present disclosure is not limited to the embodiments and may be practiced in various forms within its gist.

The present disclosure has been described with embodiments. However, the present disclosure is not limited to the embodiments and the configurations thereof. The present disclosure also includes various modifications and modifications within equivalent ranges. In addition, various combinations and forms, and other combinations and forms including only one element, more elements, or less elements are also within the scope and idea of the present disclosure.

What is claimed is:

1. A fuel injection valve, comprising:

a nozzle including a nozzle cylinder portion that forms a fuel passage therein, a nozzle bottom portion that closes one end of the nozzle cylinder portion, a suction wall surface that is recessed from a surface of the nozzle bottom portion on a side of the nozzle cylinder portion to a side opposite from the nozzle cylinder portion and that forms a suction chamber therein, an annular valve seat that is provided on a periphery of the suction wall surface, and a plurality of nozzle holes that connects the suction wall surface with a surface of the nozzle bottom portion on the side opposite from the nozzle cylinder portion to inject fuel in the fuel passage therethrough;

a needle that is provided to reciprocate inside the nozzle and configured to close the nozzle holes when the needle comes into contact with the valve seat and open the nozzle hole when the needle separates from the valve seat; and a drive unit that is configured to move the needle in a valve opening direction and in a valve closing direction, wherein a minimum value of a flow channel area between the valve seat and the needle in a case where the needle is most separated from the valve seat is a seat throttle area As, a minimum value of a flow channel area of the nozzle hole being a nozzle hole throttle area Ah, and As>Ah being satisfied, a nozzle hole of the nozzle holes includes an inlet opening portion provided on the suction wall surface, an outlet opening portion provided on the surface of the nozzle bottom portion on the side opposite from the nozzle cylinder portion, and a nozzle hole inner wall connecting the inlet opening portion with the outlet opening portion, at least one of the nozzle holes is a tapered nozzle hole formed in a tapered shape such that the nozzle hole inner wall is to be distant from a nozzle hole axis, which is an axis of the nozzle hole, toward the outlet opening portion from the inlet opening portion, the at least one tapered nozzle hole is provided such that the nozzle hole axis is in a twisted relationship with respect to an axis of the nozzle cylinder portion, and a normal line of the suction wall surface at an opening intersection point, which is an intersection point between the nozzle hole axis and the inlet opening portion, intersects the nozzle hole inner wall or an imaginary inner wall, the imaginary inner wall extending the nozzle hole inner wall to the side opposite from the nozzle cylinder portion, and in a cross section along an imaginary plane formed on a locus of the nozzle hole axis when the nozzle hole axis is rotated around the axis of the nozzle cylinder portion such that the inlet opening portion is fixed and such that a projection angle between a line, which is an extension of a line connecting the axis of the nozzle cylinder portion with a center of the inlet opening portion, and the nozzle hole axis becomes 0°, an intersection point between the normal line and the nozzle hole inner wall or the imaginary inner wall is an inner wall intersection point, a distance from the outlet opening portion to the inner wall intersection point is LA, a nozzle hole length, which is a length between the inlet opening portion and the outlet opening portion of the nozzle hole inner wall on a side where the inner wall intersection point is formed, is LB, and the tapered nozzle hole is provided such that LA/LB>−0.2 is satisfied.

2. The fuel injection valve according to claim 1, wherein the normal line intersects the nozzle hole inner wall or the imaginary inner wall, on a side opposite from the axis of the nozzle cylinder portion, of two nozzle hole inner walls or two imaginary inner walls in a cross section along the imaginary plane including the nozzle hole axis.

3. The fuel injection valve according to claim 1, wherein the normal line intersects the nozzle hole inner wall or the imaginary inner wall, on a side of the axis of the nozzle cylinder portion, of two nozzle hole inner walls or two imaginary inner walls in a cross section along the imaginary plane including the nozzle hole axis.

* * * * *